US007360781B2

(12) United States Patent
Schreiber et al.

(10) Patent No.: US 7,360,781 B2
(45) Date of Patent: Apr. 22, 2008

(54) FOLDABLE WHEELCHAIR AND AXLE PLATE THEREFOR

(75) Inventors: Philip H. Schreiber, Denver, CO (US); Michael Knopf, Baden Wuerttemberg (DE); Errol Marklein, Tairnbach (DE); Steven L. Lindquist, Broomfield, CO (US)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 11/246,935

(22) Filed: Oct. 7, 2005

(65) Prior Publication Data

US 2006/0087103 A1 Apr. 27, 2006

Related U.S. Application Data

(60) Provisional application No. 60/621,489, filed on Oct. 22, 2004, provisional application No. 60/539,033, filed on Jan. 23, 2004.

(51) Int. Cl.
*B62M 1/14* (2006.01)

(52) U.S. Cl. ................................ 280/250.1; 280/304.1

(58) Field of Classification Search ............ 280/250.1, 280/304.1, 649, 657, 647; 180/907; 301/6.5, 301/111.06, 121; 297/DIG. 4, 45
See application file for complete search history.

(56) References Cited

U.S. PATENT DOCUMENTS 4,477,117 A * 10/1984 Higgs ...................... 280/250.1
RE32,242 E * 9/1986 Minnebraker ............ 280/250.1
4,676,519 A * 6/1987 Meier ...................... 280/250.1
4,682,783 A * 7/1987 Kuschall .................. 280/250.1
4,721,321 A * 1/1988 Haury et al. ............. 280/250.1
4,768,797 A * 9/1988 Friedrich ................. 280/250.1
4,934,722 A * 6/1990 Goetzelman ............. 280/250.1
4,960,287 A * 10/1990 Lautzenhiser et al. ... 280/304.1
5,060,962 A * 10/1991 McWethy ................ 280/304.1
5,141,250 A * 8/1992 Morgan et al. .......... 280/250.1
5,186,269 A * 2/1993 Avakian et al. ............. 180/907
5,284,350 A * 2/1994 Geiger et al. ............ 280/250.1
5,590,893 A * 1/1997 Robinson et al. ........ 280/250.1
5,915,709 A * 6/1999 Radjenovic et al. ..... 280/250.1
6,264,218 B1 * 7/2001 Slagerman ............... 280/250.1
6,616,172 B1 * 9/2003 Cockram .................... 280/647

(Continued)

*Primary Examiner*—Hau Phan
(74) *Attorney, Agent, or Firm*—MacMillan, Sobanski & Todd, LLC

(57) ABSTRACT

A foldable wheelchair comprises a substantially horizontally extending upper side frame member. An upper end of an axle plate is secured to the upper side frame member. An axle housing is secured to the axle plate. A cross brace is pivotally secured directly to the axle plate at the lower end of the axle plate. A wheel mount assembly comprises an axle sleeve mount having an internal thread. An axle sleeve has an external thread that is in threaded engagement with the internal thread of the axle sleeve mount. The axle sleeve has an internal bore that accepts a wheel axle. The internal bore is angled with respect to the axis of the external threads to provide camber to a wheel. The axle sleeve is adapted to provide lateral adjustment to the wheel by rotating the axle sleeve within the axle sleeve mount any number of complete revolutions. Moreover, the axle sleeve is adapted to provide toe in and toe out adjustment to a cambered wheel by rotating the axle sleeve within the axle sleeve mount a fraction of a complete revolution.

20 Claims, 22 Drawing Sheets

U.S. PATENT DOCUMENTS 6,974,194 B2 * 12/2005 Schreiber et al. ....... 301/111.06
2004/0070164 A1 * 4/2004 Walsh et al. ............. 280/250.1
2004/0155429 A1 * 8/2004 Knopf et al. ............ 280/250.1

* cited by examiner

FOLDABLE WHEELCHAIR AND AXLE PLATE THEREFOR

CROSS REFERENCE TO RELATED APPLICATIONS

This application claims the benefit of U.S. Provisional Patent Application No. 60/539,033, filed on Jan. 23, 2004, International Patent Application No. US2005/002088, filed Jan. 24, 2005, and U.S. Provisional Patent Application No. 60/621,489, filed on Oct. 22, 2004.

BACKGROUND OF INVENTION

This invention relates in general to land vehicles and more particularly to wheelchairs and side frames therefor. Most particularly, the invention relates to a side frame for a foldable wheelchair.

A conventional wheelchair typically has a pair of side frames that includes front and rear side frame members and upper and lower side frame members arranged to form a generally rectangular frame structure, which is typically oriented in a substantially vertical orientation.

The left and right side frames may be connected together by two or more cross braces to allow the wheelchair to fold such that the left and right side frames move together to create a narrow folded structure. Each cross brace typically has a lower pivot that pivots about or near a lower side frame member of a corresponding one of the left and right side frames. The cross braces cross one another at a cross brace pivot point and pivot with respect to one another about a central longitudinal pivot axis.

In order to control the folding kinematics of the wheelchair, two cross brace linkages are typically employed. The cross brace linkages have upper ends that pivot about longitudinal axes at or near the upper side frame members. Lower ends pivot about longitudinal pivot axes on the cross braces. The cross braces linkages restrict folding motion to a single degree of freedom, making it easy to fold the wheelchair in a single motion. The resulting folding kinematics is such that the left and right wheelchair side frames remain parallel when the wheelchair is unfolded and are generally parallel when the wheelchair is folded.

Left and right seat frame members are typically supported by upper ends of the cross braces so that the seat frame members reside next to and substantially parallel to the upper side frame members when the wheelchair is unfolded. Typically, an upholstery seat sling is secured between the left and right seat frame members to form a seat surface for supporting a wheelchair occupant. In addition, left and right backrest frame members are typically secured to the side frames and flexible backrest upholstery is secured between these backrest frame members. This upholstery forms a backrest surface for supporting the occupant's back.

Generally, the side frames are supported by drive wheels, usually located at the rear of the wheelchair, and by casters, usually located at the front of the wheelchair. To achieve this, the lower frame members typically extend longitudinally from the drive wheels to the casters. Optionally, connecting members may connect the lower frame members to the drive wheels or casters.

Mounting assemblies are commonly employed for mounting the drive wheels and the casters on the side frames. Such assemblies typically incorporate a number of adjustments that allow the wheelchair occupant to customize the wheelchair to his or her anthropometry or driving condition. Some mounting assemblies are adjustable to allow the height of the drive wheels and the casters to be varied. Mounting assemblies provide the ability to adjust the camber of the drive wheels (i.e., the angle of the drive wheels with respect to a vertical plane). For example, a wheelchair with a large camber angle has more responsive turning while a wheelchair with a little or no camber angle has a smaller overall width and thus greater maneuverability in tight confines. Mounting assemblies also provide the ability to adjust the fore and aft positions of the drive wheels with respect to the wheelchair frame. Such adjustment is known as a center-of-gravity adjustment. For example, moving the drive wheels rearward produces a more stable wheelchair that is less likely to tip backwards while moving the drive wheels forward makes the wheelchair easier to balance on the drive wheels. This helps with maneuverability over obstacles, such as curbs, where the wheelchair occupant must lift the casters off the ground in order to traverse the obstacle. Further, mounting assemblies permit the drive wheels to be adjusted laterally with respect to the side frames. Such adjustment allows the wheels to be properly spaced as close as possible to the side frame, while still providing clearance to accommodate optional accessories, such as side guards or armrests. Having the wheels spaced closer to the side frame creates a narrower overall width, allowing the occupant to enter narrow confines.

There are several problems associated with conventional wheelchairs. For example, conventional foldable wheelchairs often have flimsy frames. To help stiffen the frame, thicker walled tubing is often used. Tight tolerance of the folding pivot joints may also be required. However, these requirements add to the weight and the cost of the wheelchair and may make the wheelchair more difficult to fold.

As another example, foldable wheelchairs often have side frames that do not remain parallel throughout the folding motion of the wheelchair. When the wheelchair is nearing the completely unfolded condition, the upper side frame members are further apart than the lower side frame members. This non-parallel arrangement has the effect of causing upper ends of the backrest members to separate wider than the overall width of the unfolded wheelchair. This, in turn, causes the backrest upholstery to overstretch beyond the width of the wheelchair. Providing additional slack in the backrest upholstery to accommodate this condition is undesirable because the backrest upholstery should be taut when the wheelchair is unfolded. This overstretching of the backrest upholstery makes it difficult to fold and unfold the wheelchair, and tends to overstress components of the wheelchair that support the folding pivot axes. As a result, certain components are reinforced and made heavier to deal with this stress, which further adds to the weight and the cost of the wheelchair.

As yet another example, foldable wheelchairs typically have upper and lower side frame members that which contribute to the overall height of the side frames. The height of such wheelchairs is typically so tall that it is difficult to transfer the folded wheelchair over the user's lap when loading and unloading the wheelchair into and out of a car when the user is sitting in the driver's seat.

Still another example of problems associated with wheelchairs is with regard to the cambered drive wheels, which encounter a change in camber axes when the height of the drive wheels or casters is varied. This causes the drive wheels to toe in or toe out. That is to say, the drive wheels become misaligned with respect to the plane of a supporting surface. This misalignment is undesirable because it increases rolling friction. If the drive wheels are raised or the casters are lowered, the drive wheels will toe out. Conversely, if the drive wheels are lowered or the casters are raised, the drive wheels will toe in. This occurs because the axis of the camber is no longer aligned horizontally. To correct this, the mounting assemblies that attach the drive wheels to the side frames must allow the axles of the drive wheels to rotate in order to re-align the camber angle with respect to horizontal.

While some foldable wheelchairs provide height, lateral, camber toe in and toe out and center-of-gravity adjustability of the drive wheels to address the forgoing problems, there is strong demand for a design that offers user-friendly adjustment and is lightweight. There are major challenges in designing foldable wheelchairs with a structure that is sufficiently rigid. Other factors to consider include the type and amount of material used, the number and intricacy of the component parts, and the overall weight of the wheelchair. It would be advantageous to have a wheelchair that required less material or had less intricate members, and is lightweight. It would be advantageous to have a wheelchair that has a shorter overall package size when folded.

SUMMARY OF INVENTION

The present invention relates to a foldable wheelchair comprising a substantially horizontally extending upper side frame member. An upper end of an axle plate is secured to the upper side frame member. An axle housing is secured to the axle plate. A cross brace is pivotally secured directly to the axle plate at the lower end of the axle plate.

Another foldable wheelchair comprises a substantially horizontally extending upper side frame member. An upper end of an axle plate is secured to the upper side frame member. An axle housing is secured to the axle plate. A cross brace hinge is secured directly to the axle plate so that the axle housing and the cross brace hinge are substantially equidistant from the upper side frame member. A cross brace has a lower end that is secured to the axle plate via the cross brace hinge. The cross brace hinge is operable to pivot the cross brace with respect to the axle plate.

Another foldable wheelchair comprises an upper side frame member. An axle plate has an upper end secured to the upper side frame member. A wheel axle is secured to the axle plate. A cross brace is secured to the axle plate. The cross brace is operable to pivot with respect to the axle plate.

Another foldable wheelchair comprises an axle plate, a wheel mount extension secured to, and adapted to be substantially vertically adjustable with respect to the axle plate, and an axle sleeve mount secured to, and adapted to be substantially horizontally adjustable with respect to the wheel mount extension. An axle sleeve is secured to the axle sleeve mount. The axle sleeve has an axle bore that is angled with respect to horizontal to provide camber to a wheel. The axle sleeve is rotationally adjustable with respect to the axle sleeve mount about a lateral axis for the purpose of making camber toe in and toe out adjustment.

A wheel mount assembly according to the invention comprises an axle sleeve mount having an internal thread. An axle sleeve has an external thread that is in threaded engagement with the internal thread of the axle sleeve mount. The axle sleeve has an internal bore that accepts a wheel axle. The internal bore is angled with respect to the axis of the external threads to provide camber to a wheel. The axle sleeve is adapted to provide lateral adjustment to the wheel by rotating the axle sleeve within the axle sleeve mount any number of complete revolutions. Moreover, the axle sleeve is adapted to provide toe in and toe out adjustment to a cambered wheel by rotating the axle sleeve within the axle sleeve mount a fraction of a complete revolution.

Various objects and advantages of this invention will become apparent to those skilled in the art from the following detailed description of the preferred embodiment, when read in light of the accompanying drawings.

DETAILED DESCRIPTION OF THE INVENTION

For the purpose of simplicity, the description that follows refers to wheelchairs that are left or right, or laterally, symmetric. As such, the description in most cases refers to features on one side of the wheelchair, with the understanding that a substantially identical feature may resides on the opposite side of the wheelchair. Further, similar components of the various embodiment described herein may use the same name and reference number.

Figure 1:
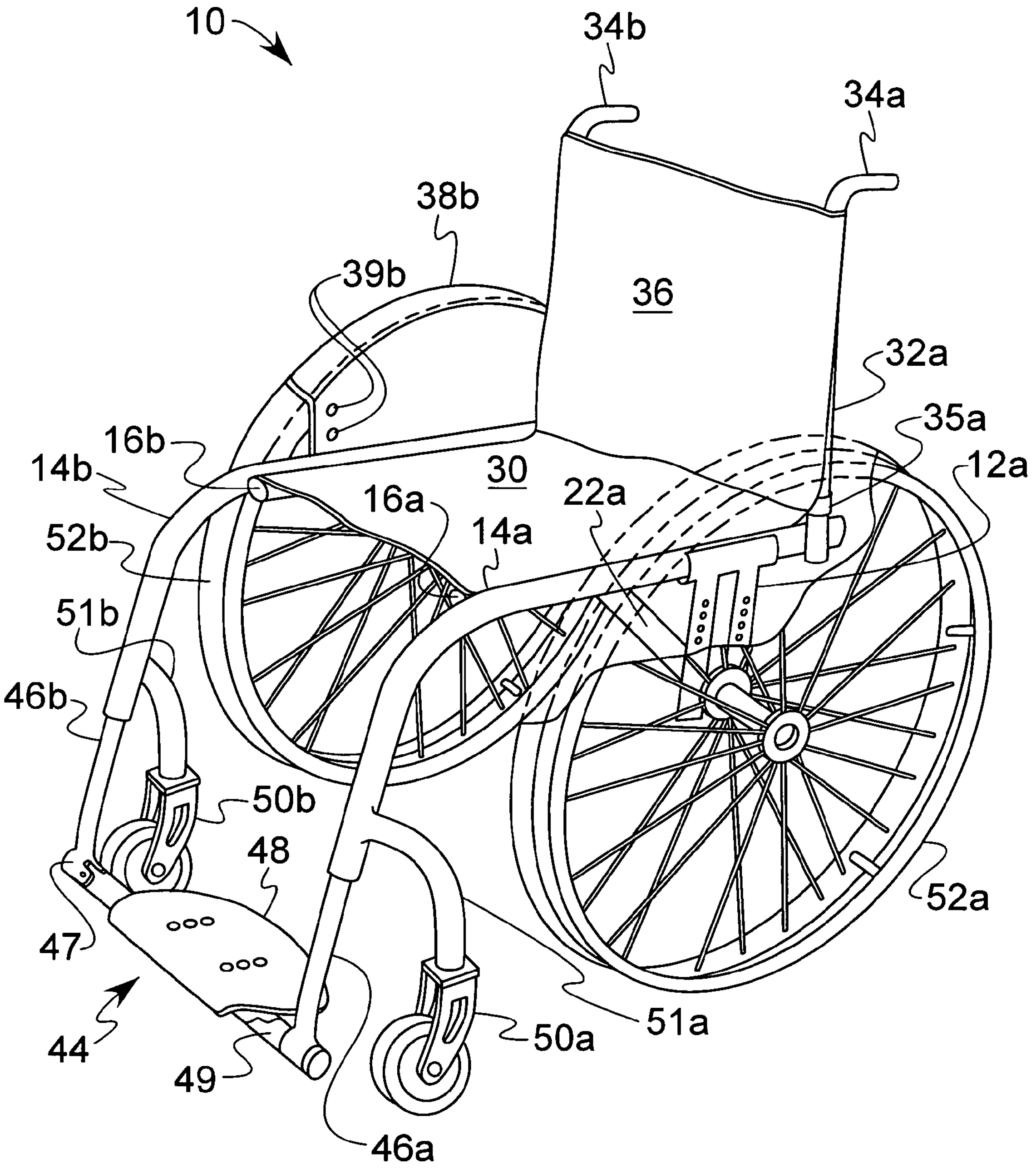
FIG. 1 is a side perspective view of a wheelchair according to a preferred embodiment of the invention with a drive wheel partially shown in hidden line and a corresponding armrest removed.
Figure 2:
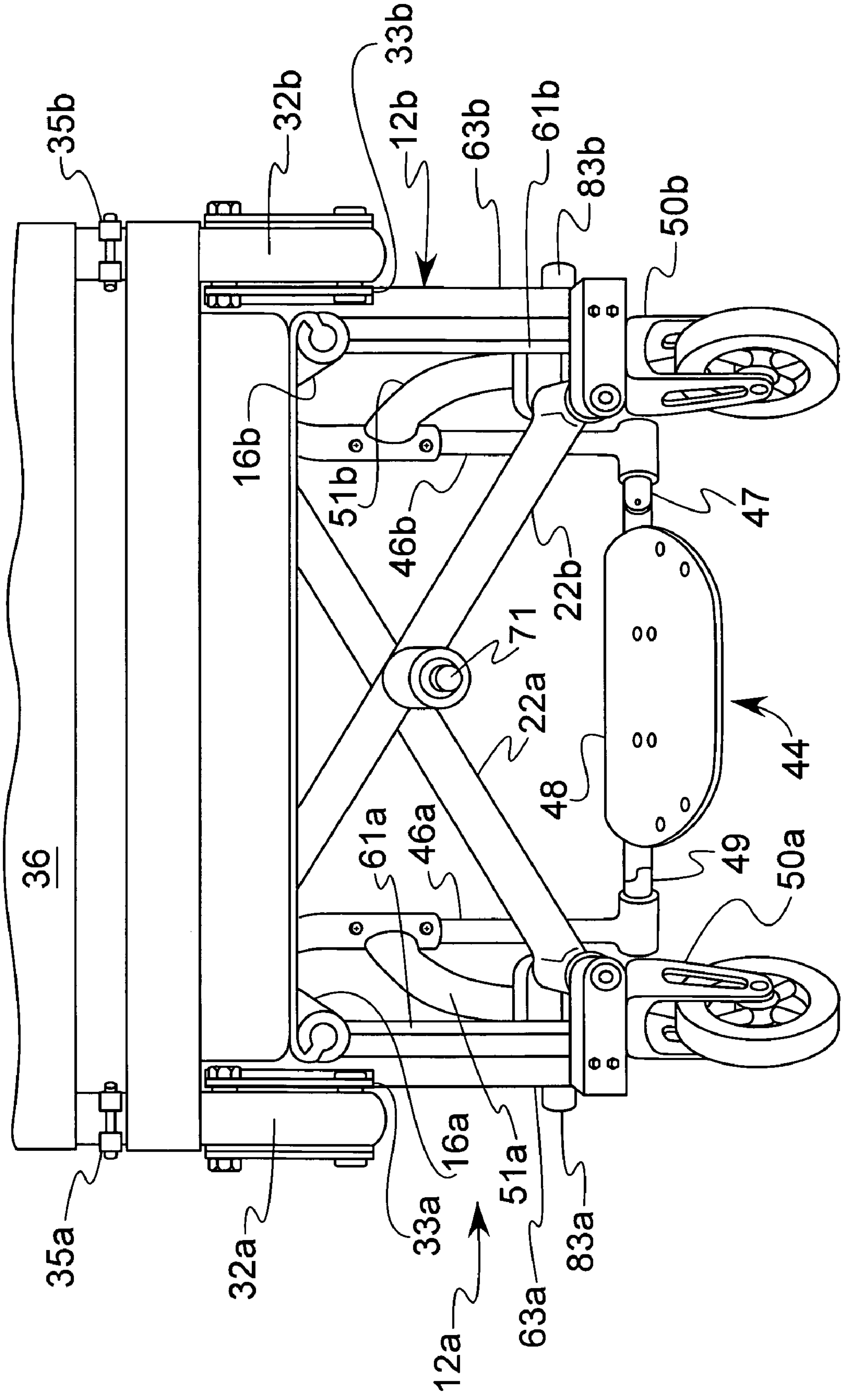
FIG. 2 is an enlarged partial rear perspective view of the wheelchair of FIG. 1 with the drive wheels and armrests removed.
Figure 3:
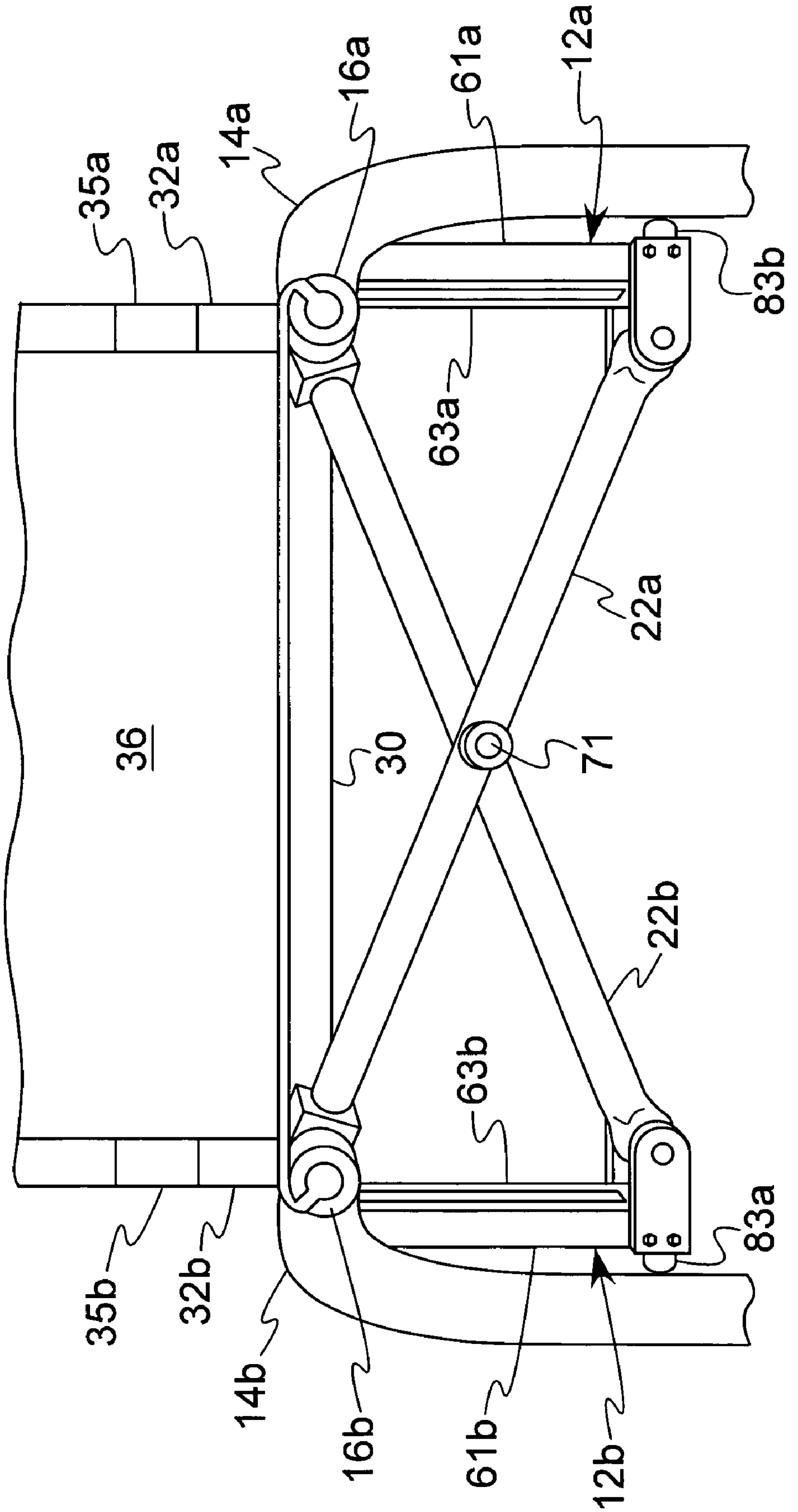
FIG. 3 is an enlarged partial front perspective view of the wheelchair of FIG. 1 with the drive wheels and armrests removed.

Referring now to the drawings, there is shown in FIG. 1 a wheelchair 10 in accordance with the present invention. As best seen in FIGS. 1-4, the wheelchair 10 includes a pair of spaced apart axle plates, namely, a left axle plate 12*a* and a right axle plate 12*b*. As will be discussed below, the axle plates 12*a* and 12*b* are each secured to a respective upper side frame member 14*a* and 14*b*.

The wheelchair 10 is generally longitudinally symmetrical, with the right side substantially being the mirror image of the left. Except when otherwise discussed, when a part or component is described on one side, it is to be understood that the wheelchair 10 has similar structure on the opposite side. For example, the wheelchair 10 further includes a pair of seat frame members, such as a left seat frame member 16*a* and a right seat frame member 16*b*, and a pair of backrest frame members, such as a left backrest frame member 32*a* and a right backrest frame member 32*b*.

The seat frame members 16*a* and 16*b* are adapted to be supported by upper side frame members 14*a* and 14*b*, respectively. Preferably, the upper side frame members 14*a* and 14*b* are provided with couplings, such as the saddles 17*a* and 17*b*, shown in FIG. 4, for supporting the seat frame members 16*a* and 16*b* relative to the upper side frame members 14*a* and 14*b*. A seat sling 30 extends substantially horizontally between the seat frame members 16*a* and 16*b*. The seat sling 30 forms a seat for supporting a wheelchair occupant. Although a sling 30 is shown, it should be understood that the invention may be practiced with other seat components, such as removable or folding panels (not shown).

The backrest frame members 32*a* and 32*b* may be secured to the upper side frame members 14*a* and 14*b* by brackets 33*a* and 33*b*, respectively. A seat back 36 extends substantially vertically between the backrest frame members 32*a* and 32*b* and is secured to the backrest frame members 32*a* and 32*b* by a plurality of straps 35*a* and 35*b*. However, the backrest frame members 32*a* and 32*b* and the seat back 36 may be secured in any suitable manner. Optionally, the seat back 36 can be adjustable in elevation by raising and lowering the seat back 36 relative to the backrest frame members 32*a* and 32*b*. Upper ends of the backrest frame members 32*a* and 32*b* may be provided with optional attendant handles 34*a* and 34*b* to aid an attendant in maneuvering the wheelchair 10.

Drive wheels 52*a* and 52*b* support the rear end of the wheelchair 10. The drive wheels 52*a* and 52*b* are adapted to be driven by the wheelchair occupant to propel and maneuver the wheelchair 10. In accordance with the preferred embodiment of the present invention, axle housings 54*a* and 54*b* are provided for mounting the drive wheels 52*a* and 52*b* to the axle plates 12*a* and 12*b*, respectively, as will be described below.

As shown in the drawings, the upper side frame members 14*a* and 14*b* are preferably adapted to support wheel guard assemblies 38*a* and 38*b*, respectively. The wheel guard assemblies 38*a* and 38*b* are secured to the upper side frame members 14*a* and 14*b* and to the backrest frame members 32*a* and 32*b* preferably by a plurality of threaded fasteners 39*a* and 39*b*, and the wheel guard assemblies 38*a* and 38*b* are preferably configured to act as armrests, side guards, and wheel guards. The wheel guard assemblies 38*a* and 38*b* are sufficiently low to permit a wheelchair occupant to gain access to the drive wheels 52*a* and 52*b*, which will be described herein below. The wheel guard assemblies 38*a* and 38*b* are provided for support of an occupant's arms, and may also include or incorporate an optional clothing protector, as shown, to protect the wheelchair occupant's person or apparel from being caught in the spokes of the drive wheels 52*a* and 52*b*.

Extending from the front of the wheelchair 10 is a footrest assembly 44. The footrest assembly 44 may include extension frame members 46*a* and 46*b* and a footplate 48. The extension frame members 46*a* and 46*b* extend forwardly and downwardly from the upper side frame members 14*a* and 14*b*, respectively. The footplate 48 is attached to the lower ends of the extension frame members 46*a* and 46*b*. Preferably, the footplate 48 is attached to the right extension frame member 46*b* by a pivotal connection, indicated generally at 47, and the footplate 48 is attached to the left extension frame member 46*a* by a selectively engageable support connection, indicated generally at 49. Thus, the footplate 48 may be engaged when the wheelchair 10 is to be in normal use and the footplate 48 may be disengaged when the wheelchair 10 is to be folded. Alternatively, separate or independent lateral leg supports (not shown) can also be supported by the extension frame members 46*a* and 46*b*.

Casters 50*a* and 50*b* support the front end of the wheelchair 10 relative to a supporting surface. The casters 50*a* and 50*b* may be affixed to the wheelchair 10 in any suitable manner. For example, as shown, the casters 50*a* and 50*b* are preferably joined to the upper side frame members 14*a* and 14*b*, by caster housings 51*a* and 51*b*, respectively, that are secured to the lower front ends of the upper side frame members 14*a* and 14*b*, respectively. Bearings within the caster housings 51*a* and 51*b* enable the casters 50*a* and 50*b* to swivel about vertical axes for maneuverability of the wheelchair 10.

Each axle plate 12*a* and 12*b* includes a front axle plate member 61*a* and 61*b*, respectively, and a rear axle plate member 63*a* and 63*b*, respectively. As shown, the front axle plate members 61*a* and 61*b*, and the rear axle plate members 63*a* and 63*b* have a rectangular cross-sectional shape. It must be understood, however, that the front axle plate members 61*a* and 61*b* and the rear axle plate members 63*a* and 63*b* can have any suitable cross-sectional shape, such as, square, round, oval or any other suitable shape.

Figure 4:
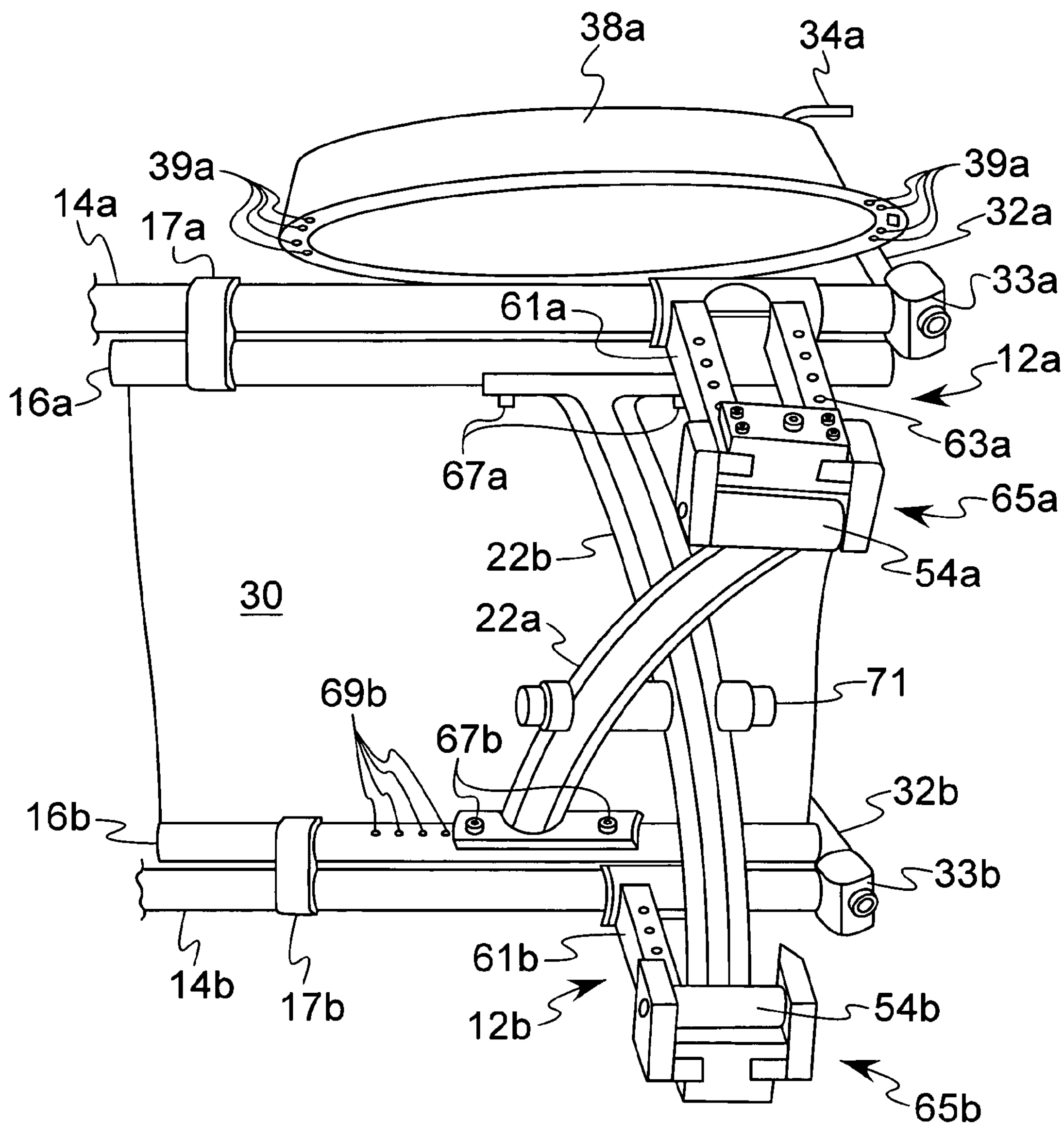
FIG. 4 is a partial bottom perspective view of the wheelchair of FIG. 1 with the drive wheels removed and at least one armrest removed.

The axle plates 12*a* and 12*b* are joined to opposite seat frame tubes or members 16*b* and 16*a*, respectively, by respective cross brace members 22*a* and 22*b*. Lower ends of the cross brace members 22*a* and 22*b* are pivotally connected to the front axle plate members 61*a* and 61*b* and the rear axle plate members 63*a* and 63*b* of the axle plates 12*a* and 12*b* by respective hinge assemblies, indicated generally at 65*a* and 65*b*. Upper ends of the cross brace members 22*a* and 22*b* are connected to opposite seat frame members 16*b* and 16*a*, preferably by threaded fasteners 67*a* and 67*b*. The seat frame members 16*b* and 16*a* preferably include a plurality of discretely spaced threaded bores 69*a* and 69*b*, as shown in FIG. 4, preferably set at regular intervals, to receive the threaded fasteners 67*a* and 67*b*, respectively. The discretely spaced threaded bores 69*a* and 69*b* permit the cross brace members 22*a* and 22*b* to be secured to the seat frame members 16*b* and 16*a* at a variety of longitudinal locations, thus allowing for adjustment in the placement of the cross brace members 22*a* and 22*b* and thus also allowing for adjustment in the placement of the axle plates 12*a* and 12*b*.

The cross brace members 22*a* and 22*b* are pivotally connected to each other by a pivot pin 71 at approximately the middle of the cross brace members 22*a* and 22*b*. The cross brace members 22*a* and 22*b* are foldable to permit the wheelchair 10 to be folded into a compact form. The wheelchair 10 is foldable into a compact form to permit the wheelchair 10 to be easily transported and stored.

As shown, the hinge assemblies 65*a* and 65*b* are laterally aligned (i.e., positioned and oriented in similar forward to rearward placement and directions). The cross brace members 22*a* and 22*b* are also laterally aligned at their respective connections to the seat frame members 16*b* and 16*a* and their respective connections to the hinge assemblies 65*a* and 65*b*. However, the cross brace members 22*a* and 22*b* are preferably curved, or offset forwardly and rearwardly (i.e., longitudinally), as shown in FIG. 4, at the pivot pin 71. The cross brace member 22*a* is curved, or bowed, forward at the pivot pin 71, while the cross brace 22*b* is curved rearward at the pivot pin 71.

Figure 6:
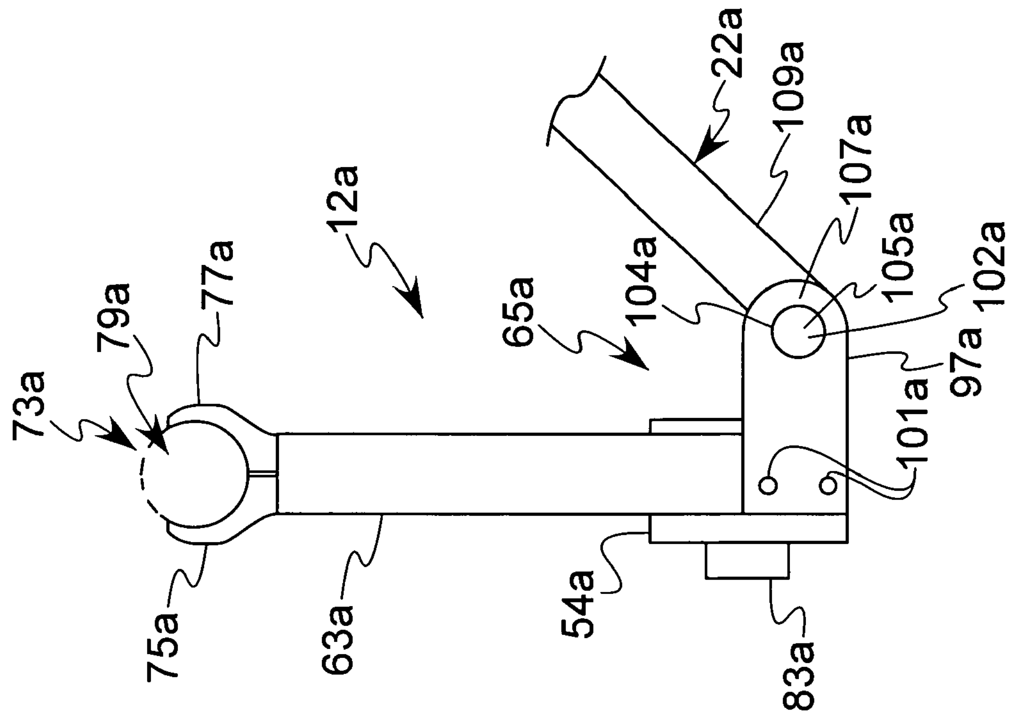
FIG. 6 is a rear schematic view in elevation of the portion of the left side frame of FIG. 5 with an upper side frame member shown in hidden line.
Figure 5:
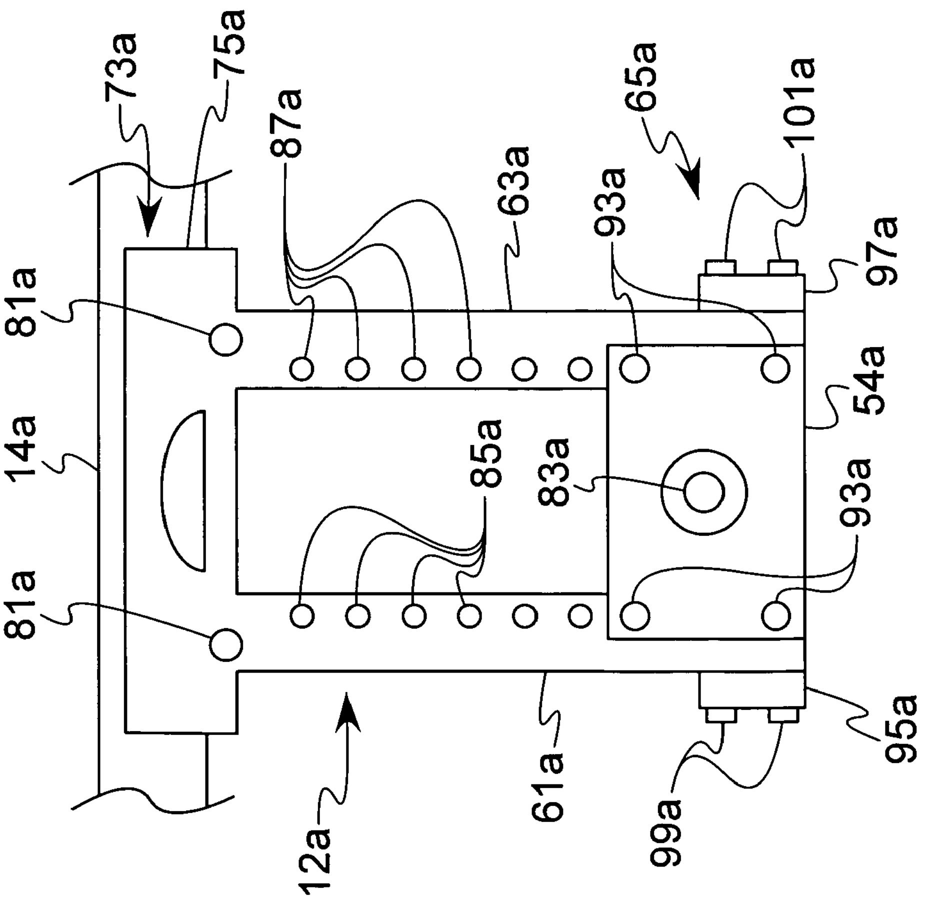
FIG. 5 is an enlarged side schematic view in elevation of a portion of the left side frame of the wheelchair of FIG. 1.
Figure 7:
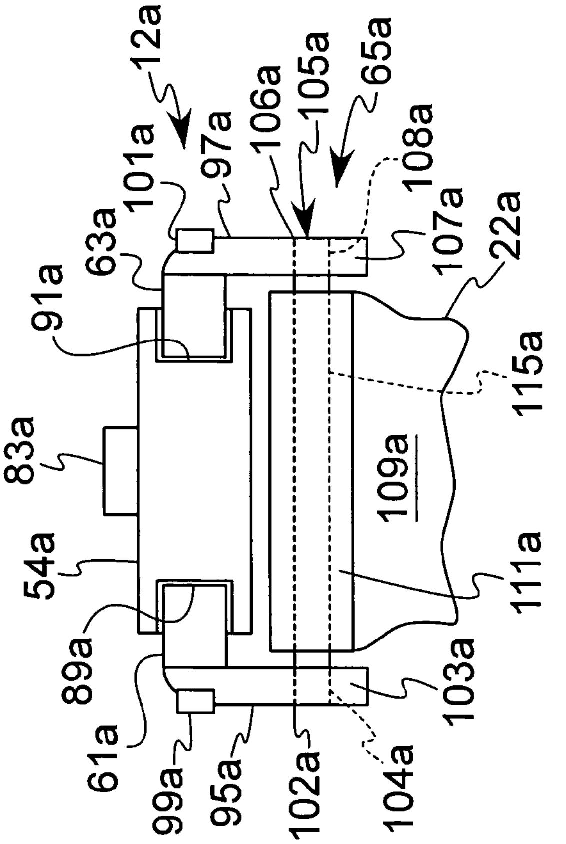
FIG. 7 is a bottom schematic view of the portion of the left side frame of FIG. 6 with a hinge pin shown in hidden line.
Figure 9:
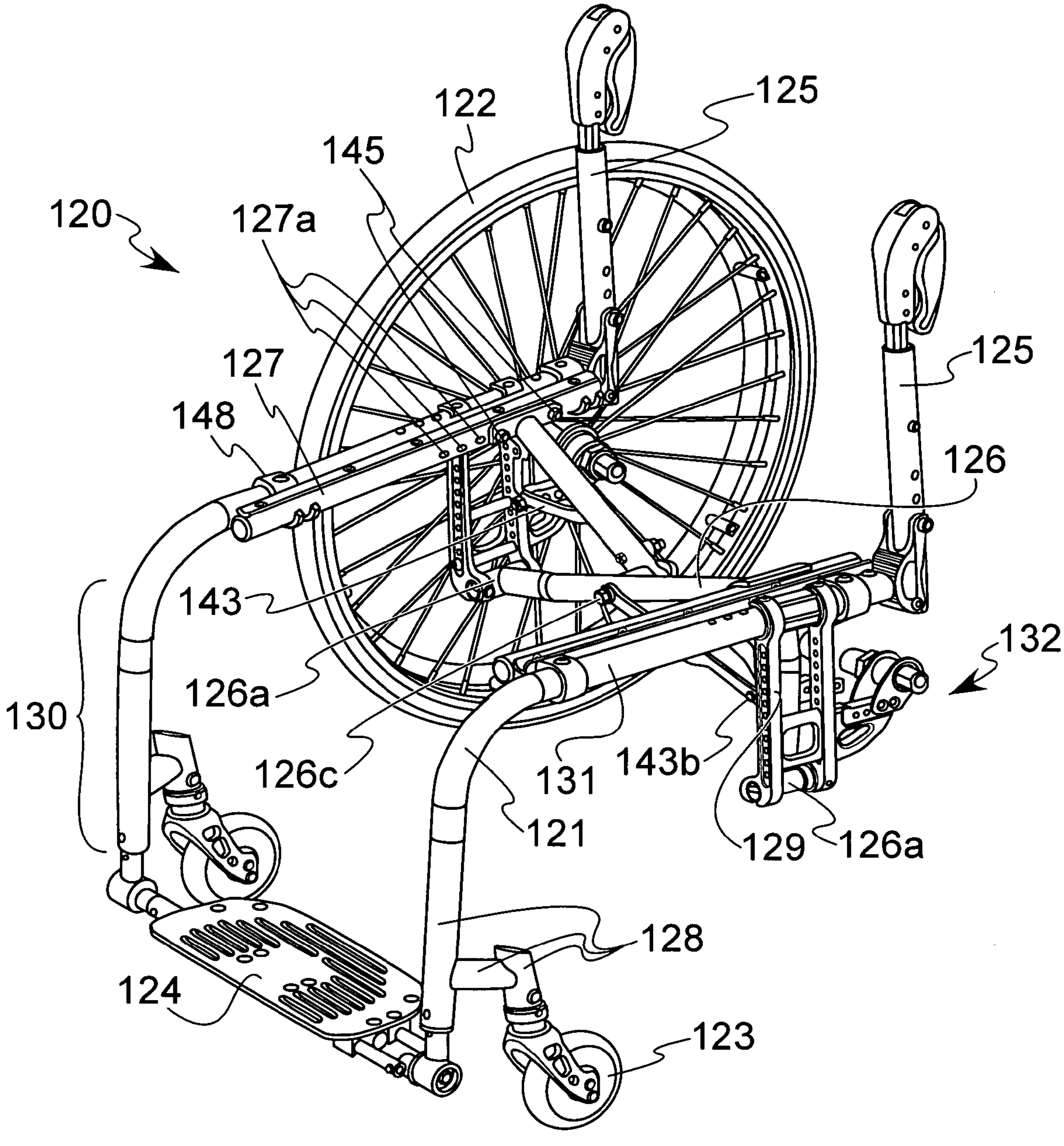
FIG. 9 is a perspective view of a wheelchair according to a first embodiment of the present invention shown in an unfolded condition, shown with backrest upholstery, seat upholstery and a left wheel removed for clarity.
Figure 10:
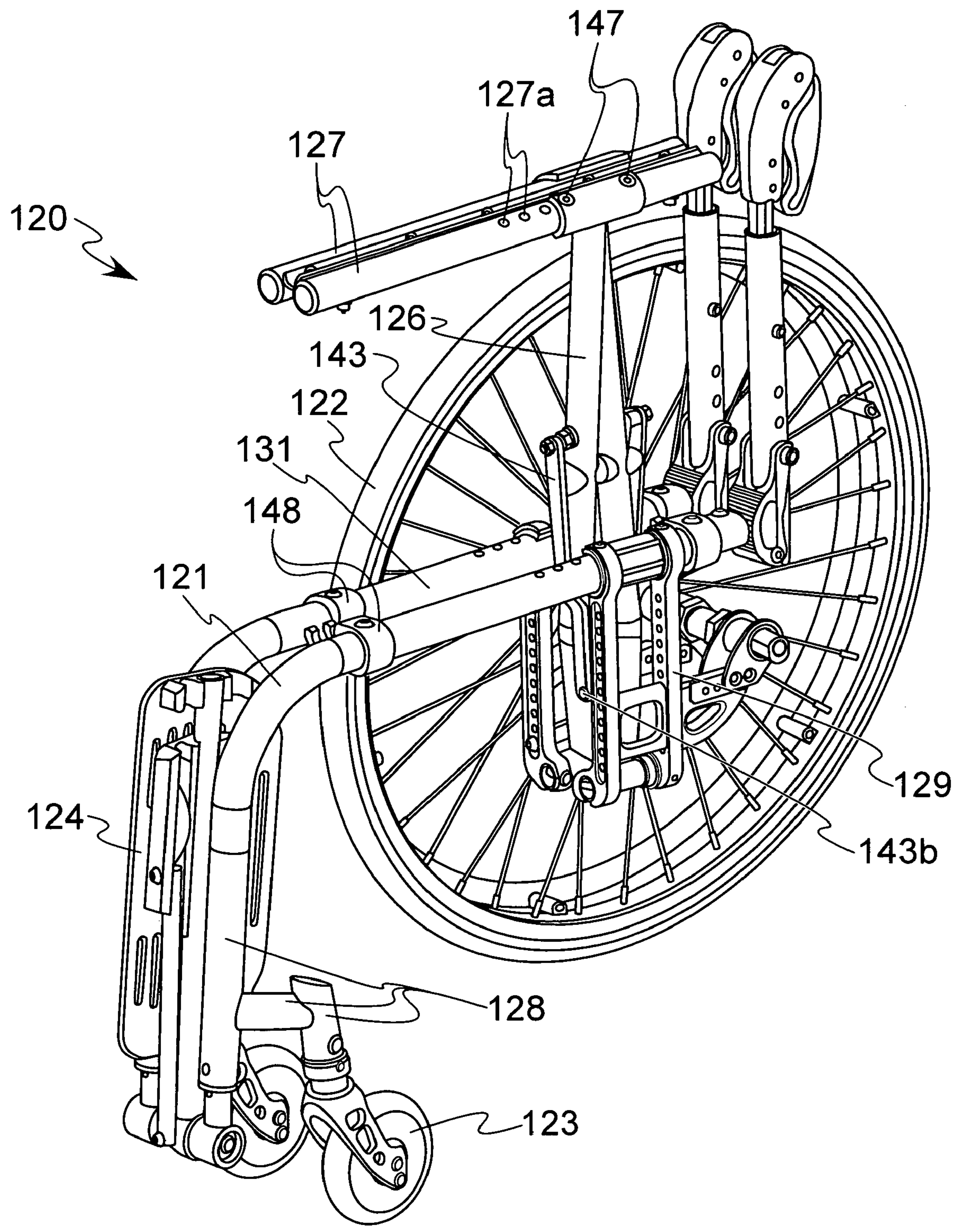
FIG. 10 is an enlarged perspective view of the wheelchair of FIG. 9, shown in a folded condition.
Figure 11:
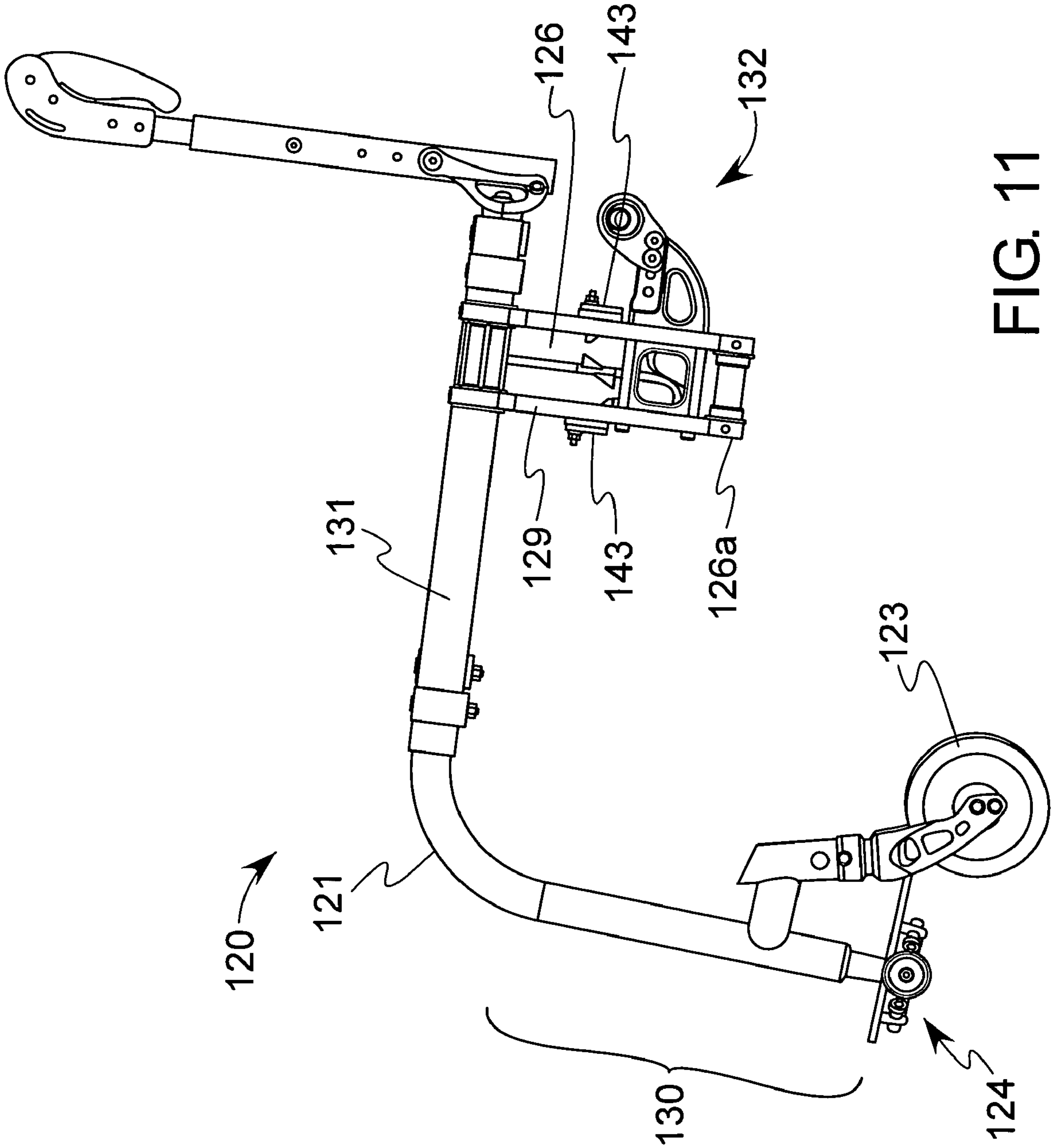
FIG. 11 is a side view of the wheelchair of FIG. 9, in elevation, shown with both of the rear wheels removed.
Figure 12:
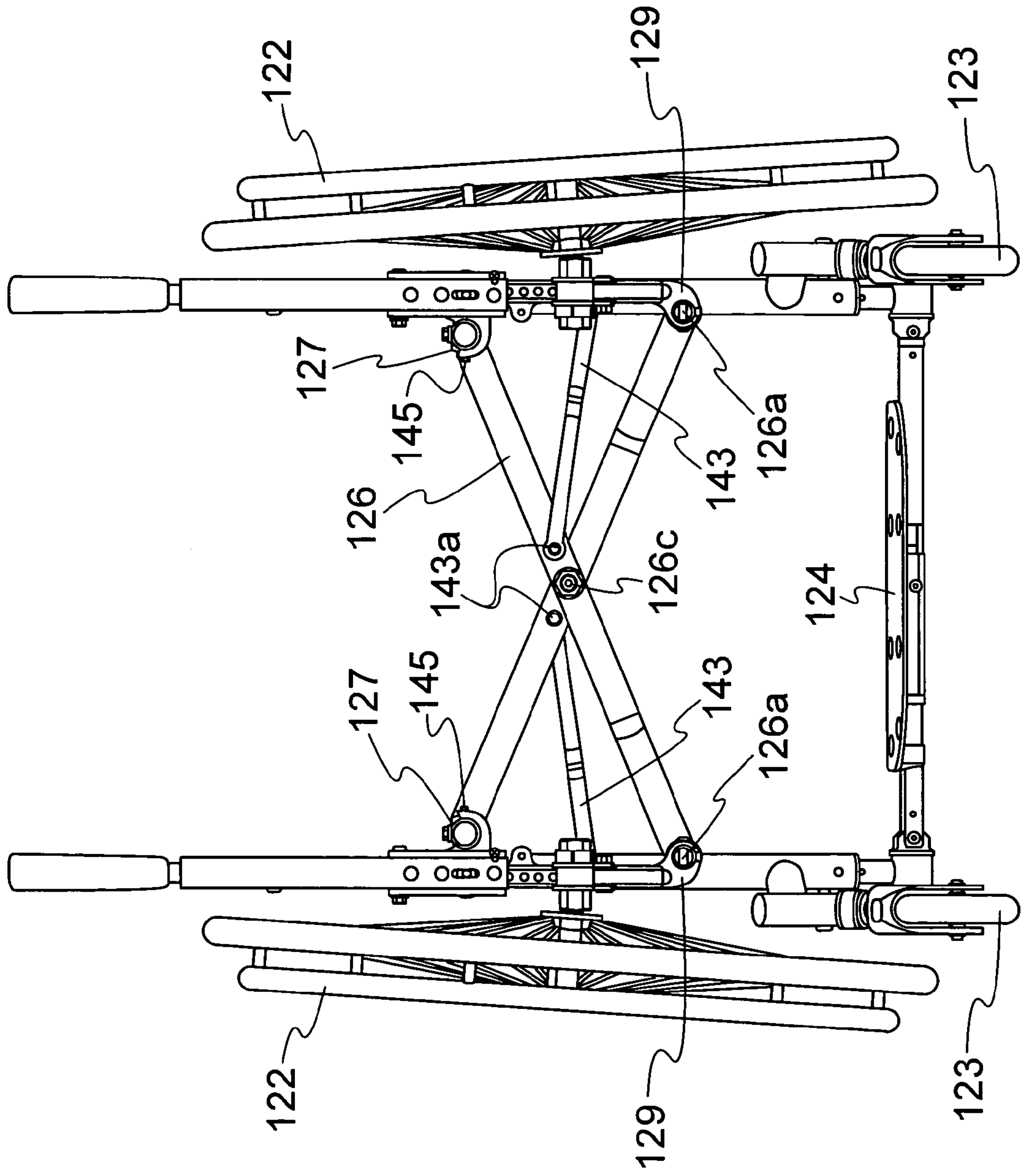
FIG. 12 is a rear view of the wheelchair of FIG. 9, in elevation.
Figure 13:
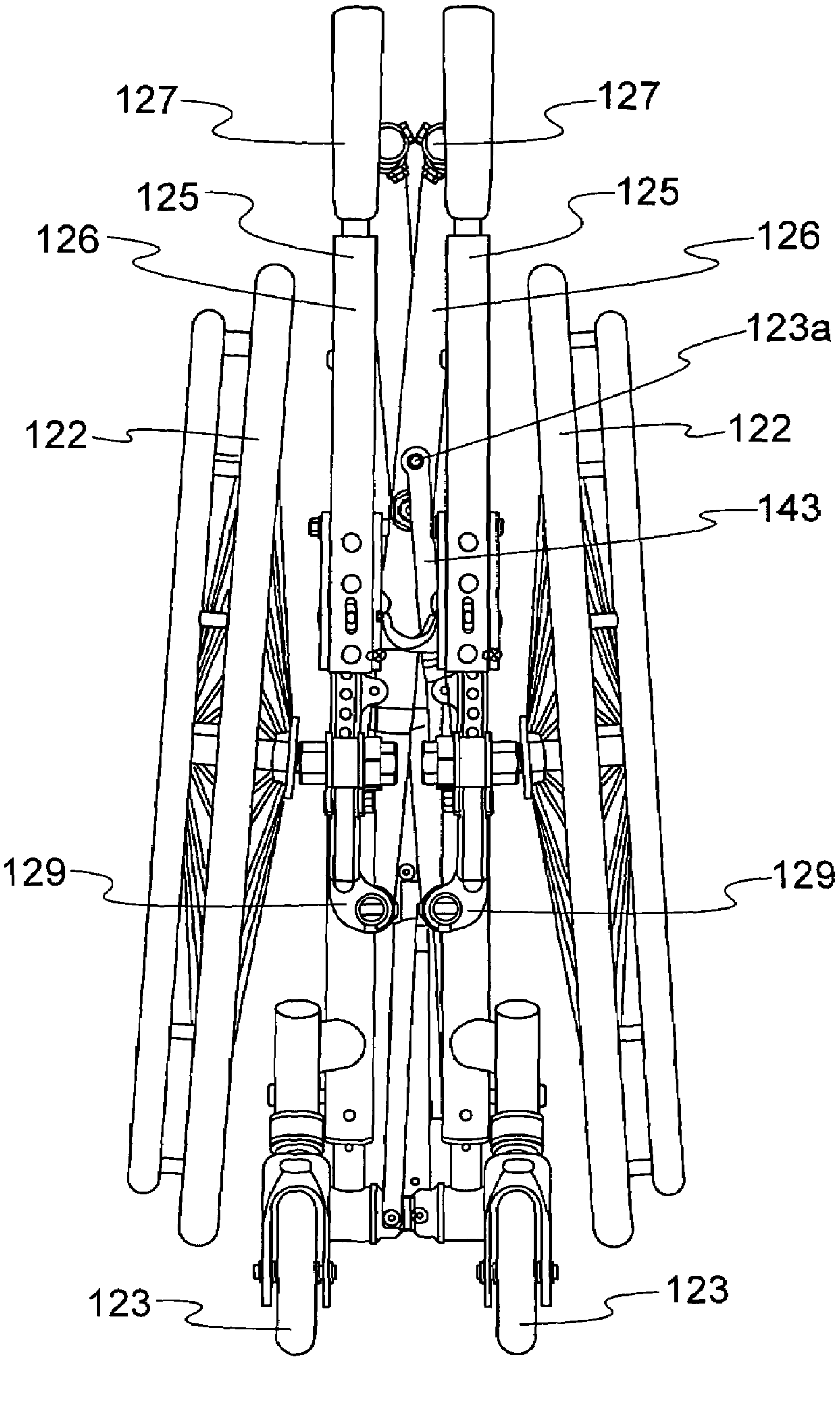
FIG. 13 is an enlarged rear view of the wheelchair of FIG. 9, shown in the folded condition with both of its rear wheels attached.

As best seen in FIGS. 5-7, the left side frame member 12*a* generally includes the front axle plate member 61*a*, the rear axle plate member 63*a*, the axle housing 54*a*, the hinge assembly 65*a*, and a clamp 73*a*. Although the side frame members 61*a* and 63*a* are shown extending downward from the left upper side frame member 14*a*, it should be understood the invention may be embodied in other configurations.

The clamp 73*a* includes an outer flange 75*a* and an inner flange 77*a*. Preferably, the flanges 75*a* and 77*a* are formed integrally to the front axle plate member 61*a* and the rear axle plate member 63*a*. The flanges 75*a* and 77*a* form a saddle 79*a* in the clamp 73*a*. The saddle 79*a* is suitable to receive the left upper side frame member 14*a*. The clamp 73*a* may further include a pair of threaded fasteners 81*a* to secure the two flanges 75*a* and 77*a* together. The left upper side frame member 14*a* is disposed in the saddle 79*a* and the two flanges 75*a* and 77*a* surround the left upper side frame member 14*a* and are secured to each other by the threaded fasteners 81*a*. Thus, the left axle plate 12*a* is secured to the left upper side frame member 14*a* by the clamp 73*a*. The clamp 73*a* allows for adjustment in the longitudinal position of the left axle plate 12*a*. It must be understood, however, that the front axle plate member 61*a* and the rear axle plate member 63*a* may be secured to the left upper side frame member 14*a* in any suitable manner, such as by direct welding or nut and bolt fasteners.

The axle housing 54*a* preferably includes an axle tube 83*a* suitable to receive the axle of the left drive wheel 52*a*. The front and rear axle plate members 61*a* and 63*a* may include a plurality of discretely spaced threaded bores 85*a* and 87*a*. A front groove or slot 89*a* and a rear groove or slot 91*a* may be formed in the axle housing 54*a* to receive the front axle plate member 61*a* and the rear axle plate member 63*a*, respectively, as shown in FIG. 7. The axle housing 54*a* is secured to the front axle plate member 61*a* and the rear axle plate member 63*a* by one or more threaded fasteners 93*a*. However, the axle housing 54*a* may alternatively be secured to the front axle plate member 61*a* and the rear axle plate member 63*a* in any other suitable manner, such as, for example, with rivets, or by welding. Preferably, the axle housing 54*a* matingly engages the front axle plate member 61*a* and the rear axle plate member 63*a* by a sliding tongue and groove engagement. The axle housing 54*a* is preferably adjustable as to slide up and down between the front axle plate member 61*a* and the rear axle plate member 63*a* and be secured to appropriate threaded bores 85*a* and 87*a*, thus allowing for adjustment of the height of the rear of the wheelchair 10 relative to the drive wheels 52*a* and 52*b*.

When the axle housing 54*a* is positioned at the bottom end of the front axle plate members 61*a* and 63*a*, as shown in FIG. 5, the left axle plate 12*a* is formed in a substantially rectangular shape. However, it must be understood that the left axle plate 12*a* may be any suitable shape. For example, when the front axle plate member 61*a* and the rear axle plate member 63*a* are secured directly (i.e., not connected via another frame member) to the left upper side frame member 14*a* and the axle housing 54*a* and the hinge assembly 65*a* are positioned in the middle of the front axle plate member 61*a* and the rear axle plate member 63*a* from top to bottom, the left axle plate 12*a* forms a substantially H-shaped side frame, and the left axle plate 12*a* can be the to have no bottom frame member, as shown in FIG. 8.

Figure 8:
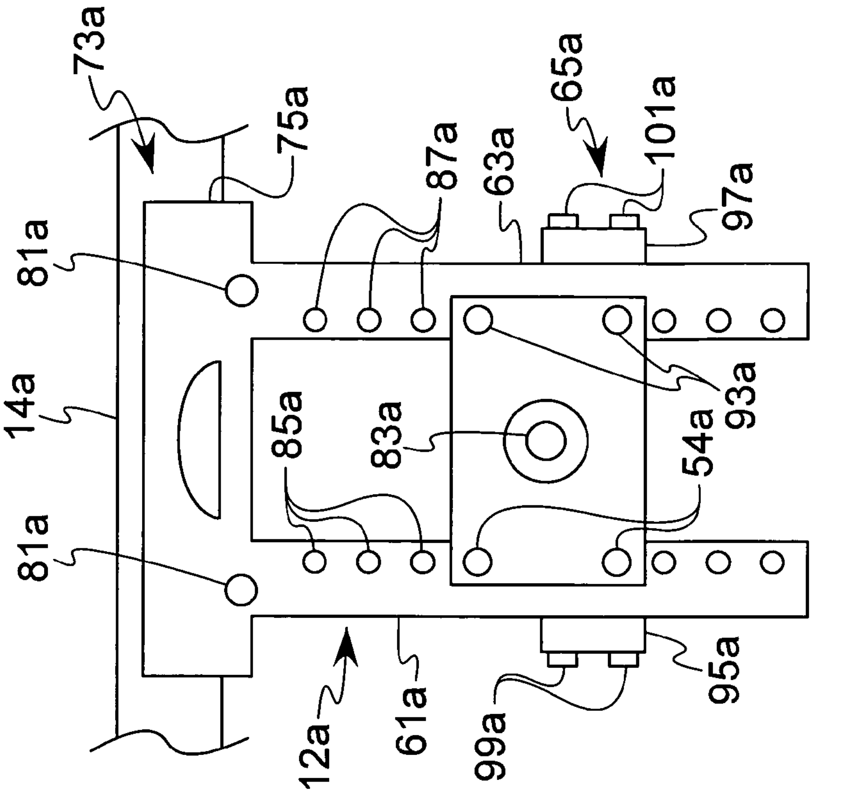
FIG. 8 is a side schematic view in elevation of a portion of a left side frame of a wheelchair with an axle housing and hinge assembly positioned in the middle of an axle plate.

Further, while the left axle plate 12*a* has been described as having the axle housing 54*a* and the hinge assembly 65*a* positioned either at the bottom end of the front axle plate members 61*a* and 63*a*, as shown in FIG. 5, or alternatively in the middle of the front axle plate member 61*a* and 63*a* from top to bottom, as shown in FIG. 8, and the axle housing 54*a* and the hinge assembly 65*a* thus being equidistant from the left upper side frame member 14*a*, it must be understood, however, that and the axle housing 54*a* and the hinge assembly 65*a* may be positioned in any suitable equidistant position or alternatively and the axle housing 54*a* and the hinge assembly 65*a* may be positioned in any suitable independent or unequidistant position, such as the axle housing 54*a* being positioned in the middle of the front axle plate member 61*a* and 63*a* from top to bottom, and the hinge assembly 65*a* being positioned at the bottom end of the front axle plate members 61*a* and 63*a*.

The left axle plate 12*a* is joined to the cross brace 22*a* by the hinge 65*a*. Generally, hinges include two leaves, or wings, with one leaf pivoting with respect to the other leaf about a common axis of rotation, or pin. Each leaf may include one or more fingers or brackets which serve to connect the leaf to an object, or part, which is to pivot with the leaf with respect to the other leaf and another object, or part, connected to the other leaf. As shown in FIGS. 5-7, the hinge 65*a* includes a first leaf front finger or bracket 95*a* and a first leaf rear finger or bracket 97*a*. The first leaf front finger 95*a* is secured directly to the front axle plate member 61*a*, for example, by threaded fasteners 99*a*. The first leaf rear finger 97*a* is secured directly to the rear axle plate member 63*a*, for example, by threaded fasteners 101*a*. The first leaf front finger 95*a* includes a first leaf front hinge knuckle portion 103*a*. A front hinge pin hole or bore 104*a* extends through the first leaf front hinge knuckle portion 103*a*. A first end 102*a* of a substantially longitudinal hinge pin 105*a* is inserted within the front hinge pin hole 104*a* and surrounded by the front hinge knuckle portion 103*a*. The first leaf rear finger 97*a* includes a first leaf rear hinge knuckle portion 107*a*. A rear hinge pin hole or bore 108*a* extends through the first leaf rear hinge knuckle portion 107*a*. A second end 106*a* of the hinge pin 105*a* is inserted within the rear hinge pin hole 108*a* and surrounded by the rear hinge knuckle portion 107*a*.

As shown in FIG. 6, the lower end of the cross brace 22*a* includes a second hinge leaf portion 109*a*. The second hinge leaf portion 109*a* includes a second leaf knuckle portion 111*a* (see FIG. 7) that is disposed between the first leaf front hinge knuckle portion 103*a* and the first leaf rear hinge knuckle portion 107*a*. A middle hinge pin hole or bore 115*a* extends through the second leaf knuckle portion 111*a*. The hinge pin 105*a* is inserted within the middle hinge pin hole 115*a*. The hinge pin 105*a* thus extends longitudinally through the front hinge pin hole 104*a*, the middle hinge pin hole 115*a*, and the rear hinge pin hole 108*a*. The hinge 65*a* is thus operable to pivot the cross brace 22*a* with respect to the left axle plate 12*a*. However, the hinge 65*a* may alternatively be formed in any suitable manner. For example, the hinge pin 105*a* may be formed to the second leaf knuckle portion 111*a*. The second leaf knuckle portion 111*a* would not have a middle hinge pin hole 115*a* and the hinge pin 105*a* may then be described as two knobs protruding from opposite ends of the second leaf knuckle portion 111*a*.

Although the hinge 65*a* has been described as including substantially longitudinal hinge pin 105*a*, it must be understood however that the hinge pin 105*a* may be oriented in any suitable manner. For example, if the pivot pin 71 is oriented vertically, and the cross braces 22*a* and 22*b* are suitably connected to the seat frame members 16*a* and 16*b*, the hinge pin 105*a* may be a vertically oriented hinge pin.

Now with reference to FIGS. 9 through 13, there is illustrated another wheelchair 120 including a pair of side frames 121, drive wheels 122 supporting the rear end of the wheelchair 120, casters 123 supporting the front end of the wheelchair 120, a footrest assembly 124, which is preferably a folding footrest, and backrest frame members 125. A pair of cross braces 126 pivots with respect to the side frames 121 and may support a seat frame member 127 at an upper end thereof.

The side frames 121 may include a frame structure 128, which may support a caster 123, the footrest assembly 124, and an axle plate 129. The frame structure 128 may be comprised of a front side frame member 130 and an upper side frame member 131. The axle plate 129 is preferably adjustable fore and aft with respect to the frame structure 128. Such adjustment may be used to achieve course center-of-gravity adjustment of the rear wheels 122.

Figure 14:
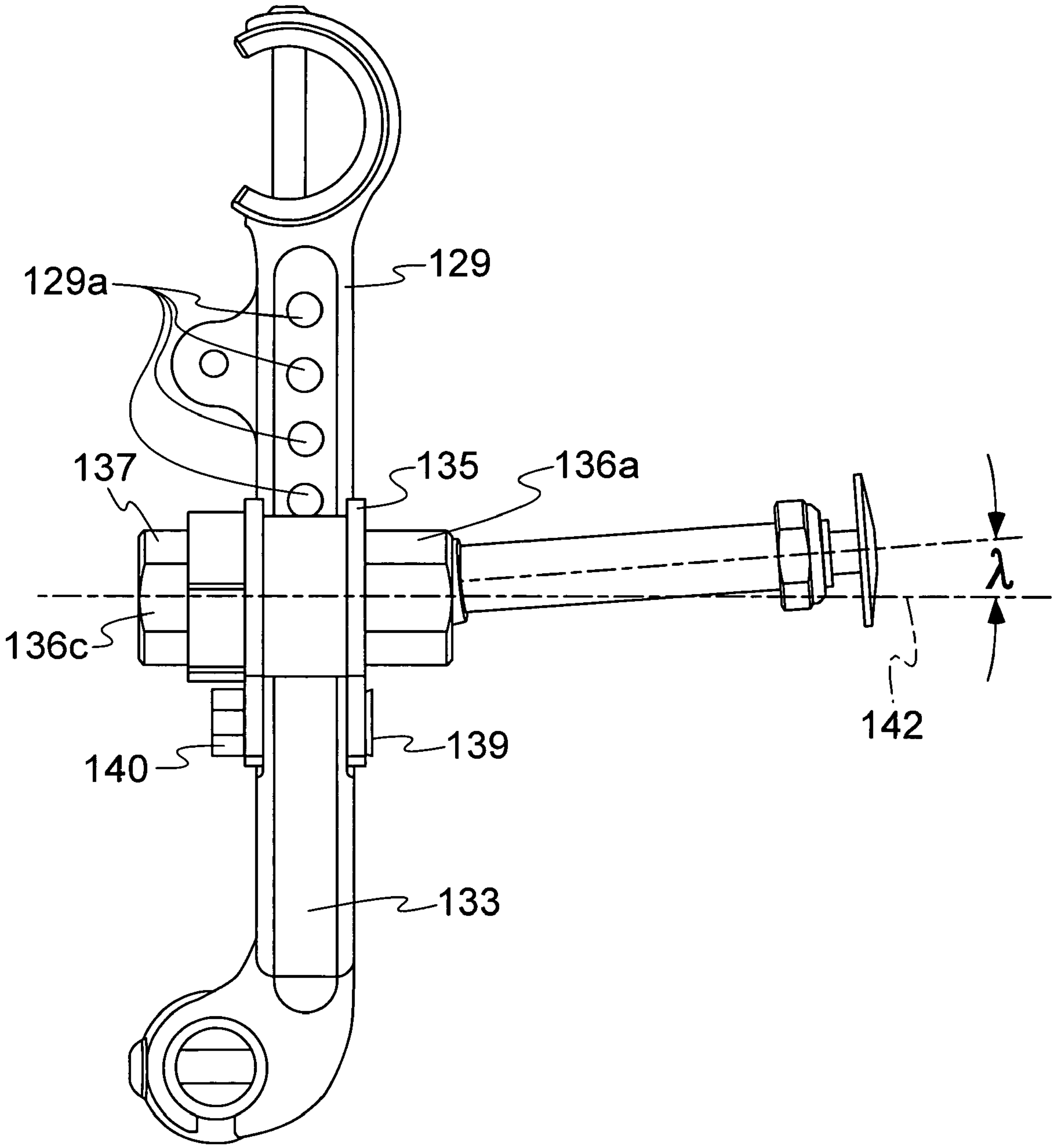
FIG. 14 is an enlarged rear view of the wheel mount assembly and axle plate of the wheelchair of FIG. 9.
Figure 15:
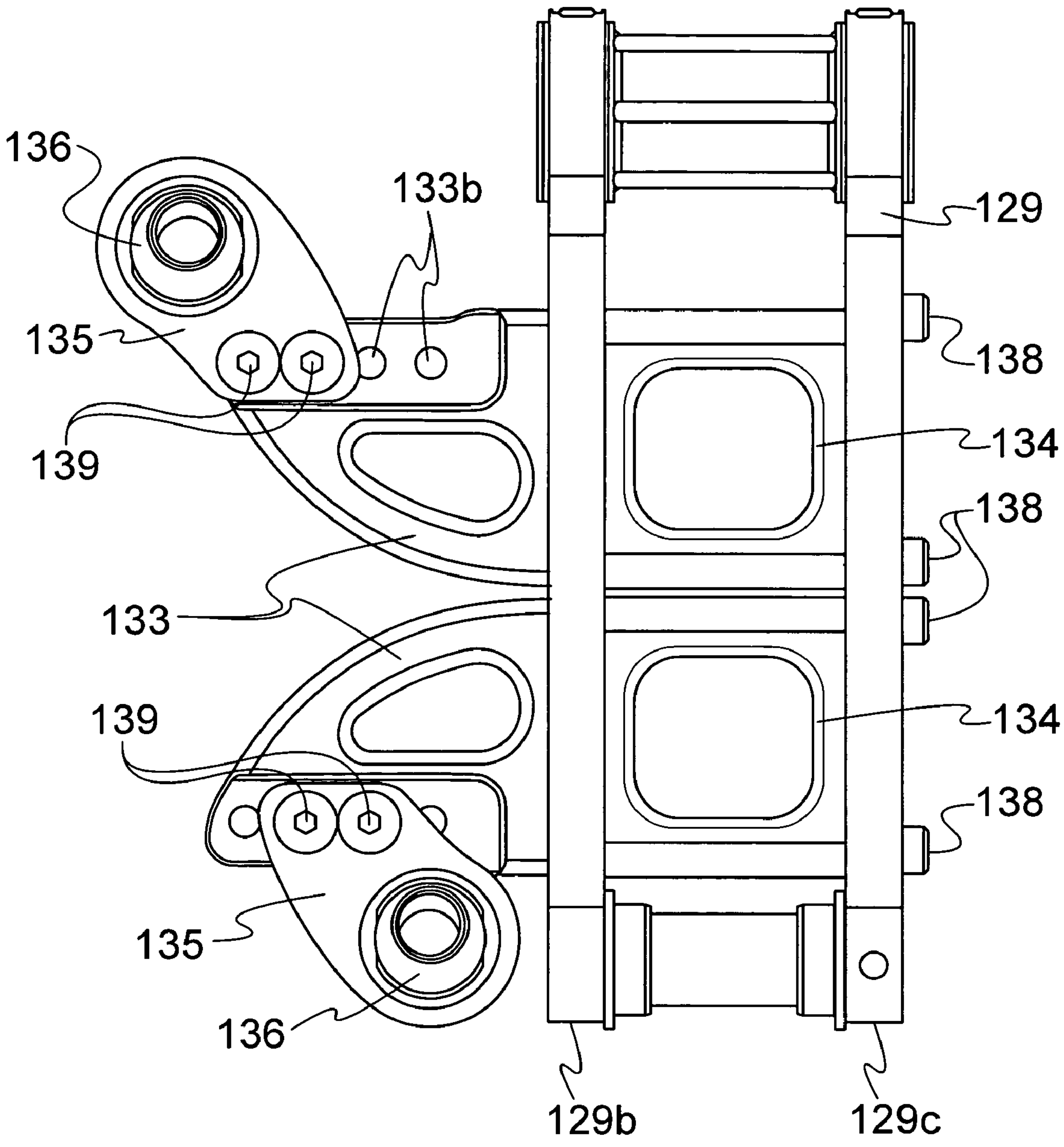
FIG. 15 is a side view of the wheel mount assembly and axle plate of FIG. 14, showing a wheel mount extension in upright and inverted positions, and an axle sleeve mount in forward facing and rearward facing positions.
Figure 16:
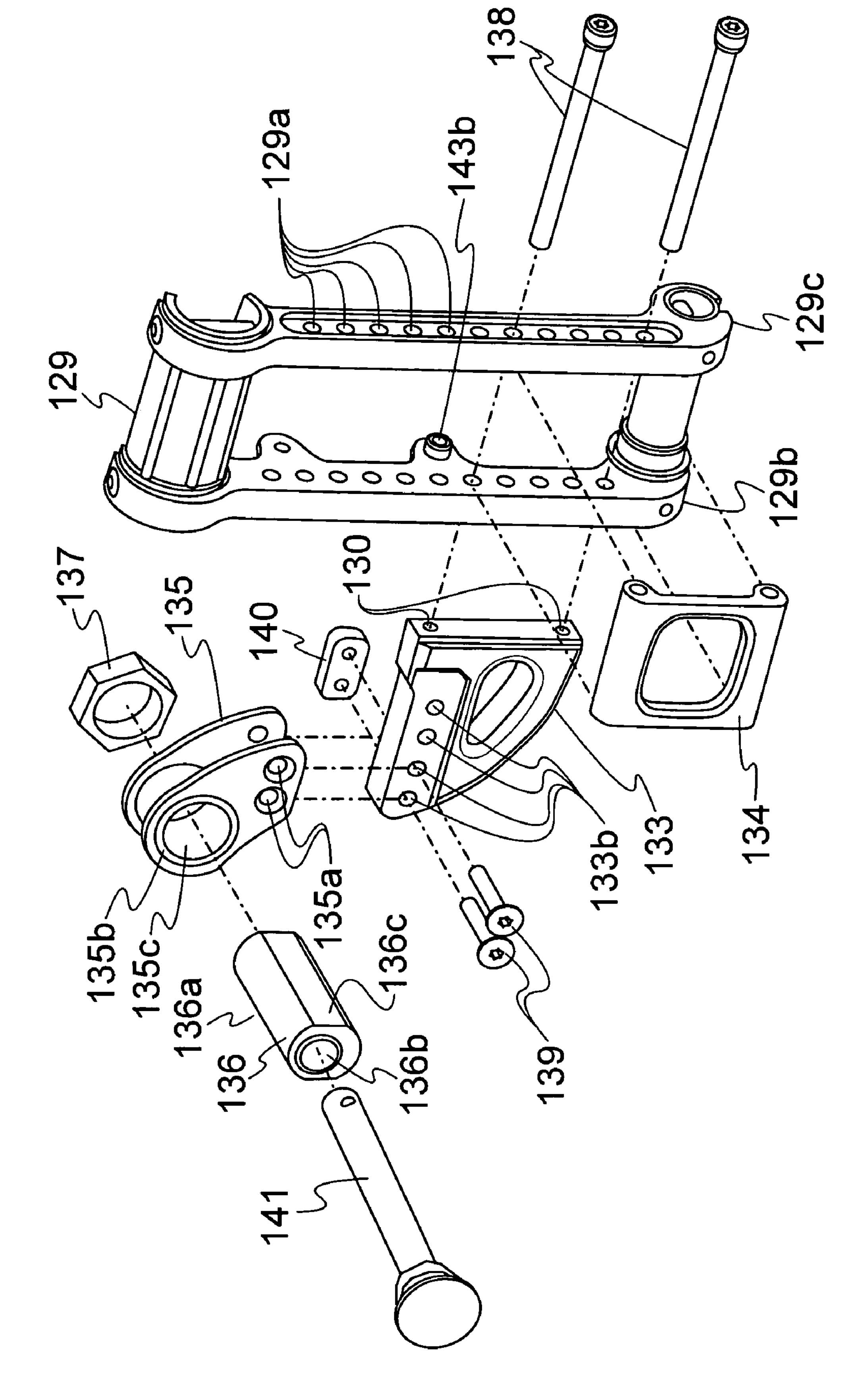
FIG. 16 is a reduced scale exploded perspective view of the wheel mount assembly and side frame member of FIG. 15.

Attached to the axle plate 129 is a drive wheel mounting assembly 132. As shown in FIGS. 14 through 16, the drive wheel mounting assembly 132 may include a wheel mount extension 133, one or more stiffening blocks 134, an axle sleeve mount 135, a threaded axle sleeve 136, and a locking nut 137. The wheel mount extension 133 is preferably vertically adjustable with respect to the axle plate 129. This allows the rear seat height of the wheelchair 120 to be changed by moving the drive wheel 122 vertically in relation to the side frame 121. The wheel mount extension 133 may be selectively positioned and secured to the axle plate 129 using bolts 138 that pass through longitudinal holes 129*a* on both legs 129*b*, 129*c* of the axle plate 129, and into tapped holes 133*a* of the wheel mount extension 133. The stiffening blocks 134 may reside between the legs 129*b*, 129*c*, and may be secured with the bolts 138 to help stiffen and strengthen the structure. The axle sleeve mount 135 may be fore and aft adjustable with respect to the wheel mount extension 133 to provide fine adjustment of the drive wheel center-of-gravity position. The axle sleeve mount 135 may be selectively positioned and secured to the wheel mount extension 133 using bolts 139 and nut 140 that pass through aligned holes 133*b* and 135*a* in the wheel mount extension 133 and the axle sleeve mount 135, respectively.

As depicted in FIG. 15, the wheel mount extension 133 may be mounted upright or inverted. This has the advantage of increasing the overall height adjustment of the drive wheels 122, while keeping the height of the axle plate 129 as short as possible.

Also depicted in FIG. 15, the axle sleeve mount 135 may be mounted facing forward or rearward. This has the advantage of increasing the overall center-of-gravity adjustment of the drive wheels 122, while keeping the wheel mount extension 133 as short as possible.

The axle sleeve 136 is preferably in threaded engagement with the axle sleeve mount 135. External threads 136*a* on the major diameter of the axle sleeve 136 may mate with internal threads 135*b* in the major bore 135*c* of the axle sleeve mount 135. A drive wheel axle 141 may reside within a bore 136*b* in the axle sleeve 136. This bore may be oriented at some angle θ, as shown in FIG. 14, with respect to a horizontal threaded axis 142 of the axle sleeve 136. The angle θ of the bore establishes a camber for the drive wheels 122. A locking nut 137 may be in threaded engagement with the axle sleeve 136 to lock the axle sleeve 136 rotationally with respect to the axle sleeve mount 135. A pair of wrench flats 136*c* may be provided on the axle sleeve 136. This arrangement provides toe in and toe out adjustment and lateral adjustment of the drive wheels 122. To adjust the drive wheel 122 laterally with respect to the side frame 121, the axle nut may be loosened and the axle sleeve 136 may be rotated a prescribed number of complete revolutions within the axle sleeve mount 135 until the drive wheel 122 is properly repositioned. To eliminate toe in and toe out, the locking nut 137 may be loosened and the axle sleeve 136 may be rotated a fraction of a turn until the wrench flats are positioned vertically. The locking nut 137 then may be tightened to fix the position of the axle sleeve 136.

The lower end of the axle plate 129 is preferably pivotally connected to the lower end of the folding cross brace 126 at a pivot point 126*a*. The two cross braces 126 are positioned longitudinally with respect to one another and are pivotally connected to one another about a generally longitudinal axis at cross brace pivot point 126*c*. A cross brace link 143 is pivotally connected at one end at a pivot point 143*a* to the cross brace 126 and at the opposite end at a pivot point 143*b* preferably to some mid-height region of the axle plate 129. All of these pivot points 126*a*, 126*c*, 143*a*, 143*b* have pivot axes that are aligned parallel to the upper side frame member 131. This arrangement of linkages and corresponding pivot axis locations is designed such that the left and right side frames remain parallel when the wheelchair is completely unfolded and completely folded. This arrangement is also designed such that the left and right side frames remain substantially parallel as the wheelchair approaches the unfolded position. Such an arrangement has several advantages. By allowing the two side frames to remain substantially parallel as the wheelchair 120 approaches the unfolded condition, the backrest frame members 125 also remain substantially parallel so that the backrest upholstery does not become overstretched. Also, by repositioning the cross brace linkage pivot point 143*b* near the mid-height region of the axle plate 129, instead of coaxial or near the upper side frame member 131, as is done on conventional foldable wheelchairs, the lower pivot point 126*a* of the axle plate 129 may be raised closer to the upper side frame member 131. This arrangement has the advantage of creating a shorter side frame that is more easily transportable, for example, into and out of a car.

The seat frame member 127 may be secured to the cross brace 126 using two bolts 144 and two nuts 145. The seat frame member 127 may be adjustable with respect to the cross brace 126 by aligning the holes in the cross brace 126 with a selected pair of holes in a series of holes 127*a* in the seat frame member 127. This adjustment allows the seat frame member 127 to be repositioned when the axle plate 129 is moved fore and aft for course center of gravity adjustment. The fact that the seat frame member 127 is secured to the cross brace 126 using fasteners makes it practical to interchange the seat frame member 127 with seat frame members of various lengths on the present wheelchair. Such interchangeability is advantageous because the wheelchair is adaptable for seat depth growth. This growth in seat depth may correspond to growth in backrest depth (not shown) by allowing the backrest to be telescopically adjustable in the longitudinal direction with respect to the upper side frame member 121.

Figure 19:
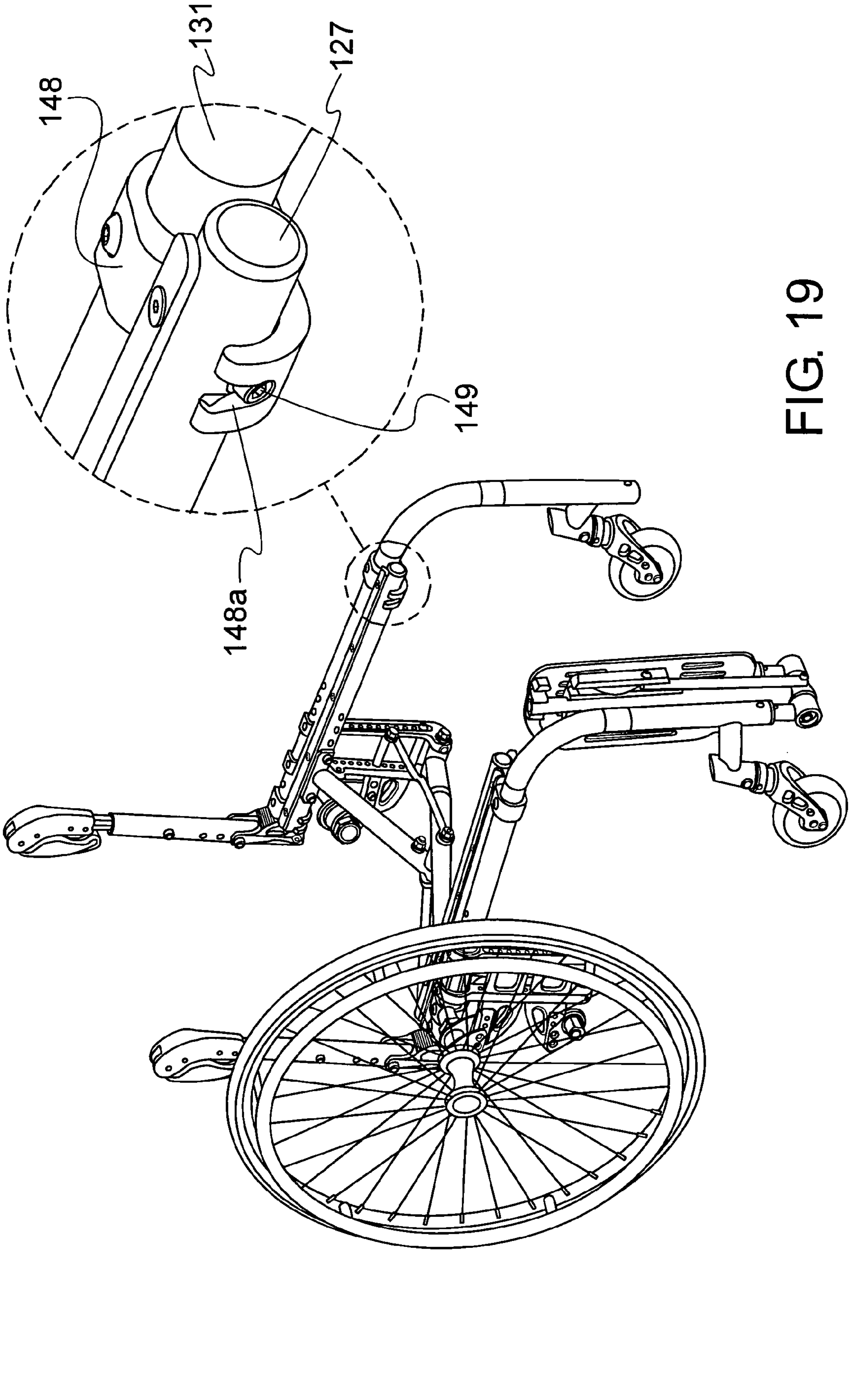
FIG. 19 is a reduced scale perspective view of a wheelchair according to yet another embodiment of the present invention shown in the unfolded condition, with backrest upholstery, seat upholstery and left wheel removed and shown with an enlarged portion including an upper frame member and a cradle for supporting a seat frame member.

As shown in FIG. 19, cradles 148 may be secured to the upper side frame member 131 that capture and support the seat frame member 127 at forward and rearward locations. In conventional foldable wheelchairs, cradles allow relative translation of the seat frame member 137 with respect to the upper side frame member 131 along the axis of the seat frame member 127. Such translation creates a flimsy wheelchair structure, allowing the left side frame to twist with respect to the right side frame. In order to eliminate such translation, and thereby stiffen the wheelchair, a notch 148*a* is added to the cradles, accompanied by mating protrusions 149 on the seat frame member 127. The notch 148*a* is shaped to allow the protrusion 149 to freely enter the notch, as the wheelchair is unfolded. When unfolded, the notch captures the protrusion, preventing relative translation of the seat frame member 127 with respect to the side frame 121 along the axis of the seat frame member 127. This arrangement also has the advantage of reducing stresses on other components of the wheelchair structure. In particular, the stresses present in the cross braces and the seat frame members 127 are minimized. This, in turn, allows these structures to be made from thinner walled tubing, thereby reducing the weight of the wheelchair.

While the feature described above includes a cradle with a notch secured to the upper side frame member 131, and a mating protrusion in the seat frame member 127, it is understood that other arrangements are possible that achieve the same end result. For example, the mounting location of the cradle and protrusion can be reversed, so that the cradle is inverted and is secured to the seat frame member 127, while the protrusion is secured to the upper side frame member 131. The notch need not be formed in the cradle, but could be formed in the upper side frame member 131. This relation could also be reversed so that the notch could be formed in the seat frame member 127, and the protrusion could be formed in the upper side frame members 131. Any permutation and/or combination of the above relationships that achieves the desired end result of prohibiting relative translation of the seat frame member 127 with respect to the upper side frame member 131 when the wheelchair 120 is unfolded is considered to be within the scope of this invention.

Figure 17:
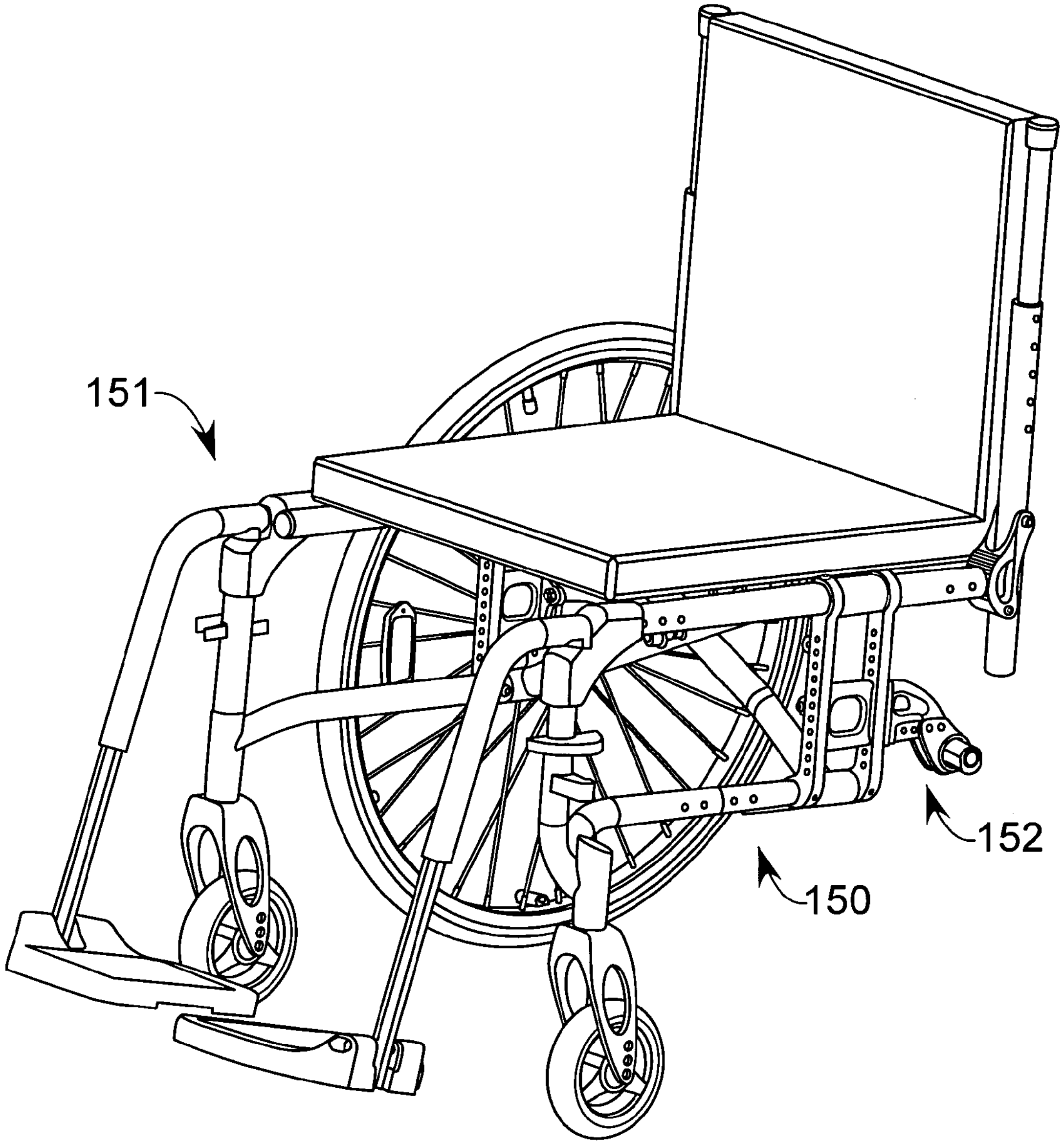
FIG. 17 is a perspective view of a wheelchair according to another embodiment of the present invention shown in the unfolded condition, shown with the left wheel removed for clarity.
Figure 18:
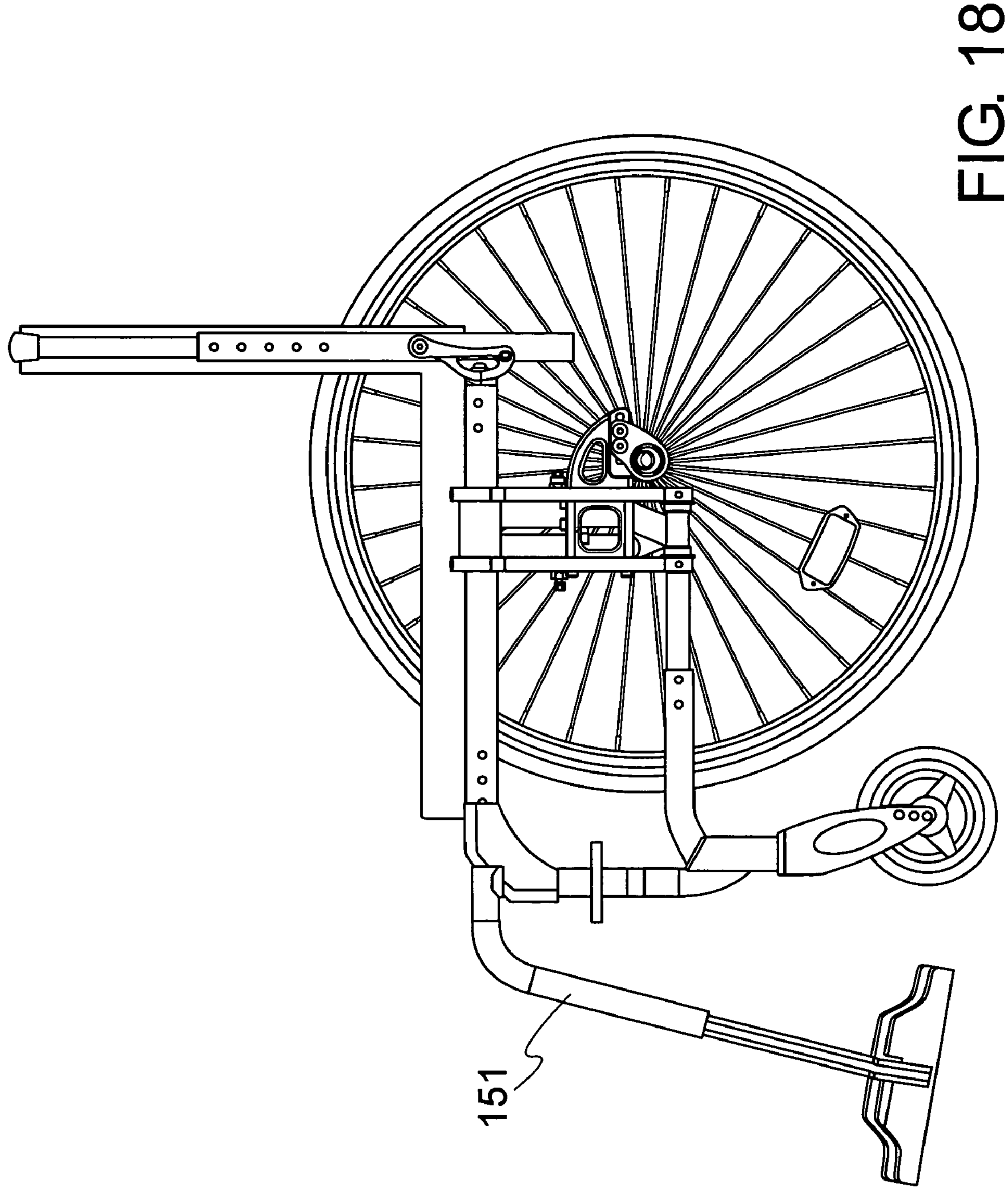
FIG. 18 is a side view of the wheelchair of FIG. 17.

While the invention described thus far includes a wheelchair with no lower side frame, the structure and arrangement of the wheelchair frame can be modified to include a lower side frame 150, as depicted in FIGS. 17 and 18. The embodiment also illustrates a swing-away footrest assembly 151 located at the front of the wheelchair. The footrest assembly 151 is intended to be representative of such swing away footrest assemblies currently known in the art. The lower side frame member is connected to the lower end of the axle plate 129 and, in this example, the lower side frame member is coaxial with the lower pivot axis 152 of the cross brace 126. The axle plate 129 is moveable longitudinally with respect to both the upper and lower side frame members to allow for coarse center-of-gravity adjustment of the drive wheels 122. The axle plate 129 lends itself to either embodiment, with or without a lower side frame member.

Figure 21:
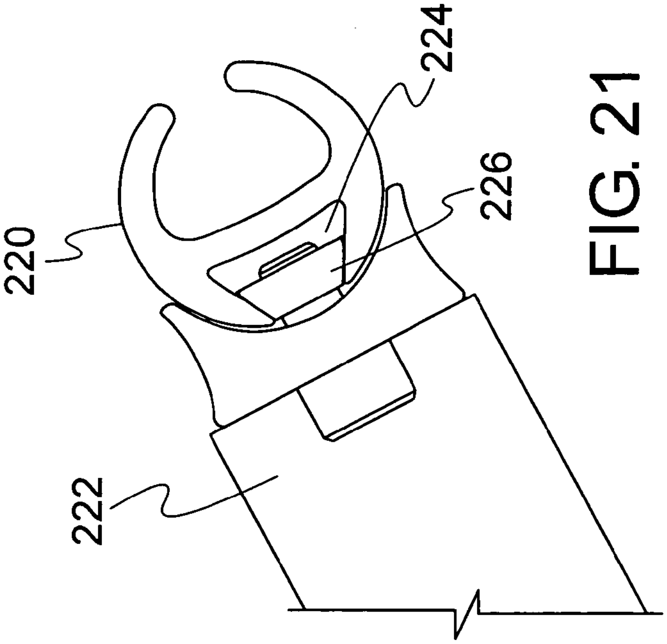
FIG. 21 is an enlarged front elevational view of a seat frame member the cross braces shown in FIG. 20, with the seat frame member shown in cross-section to clearly show the dovetail slots and the dovetail nuts.
Figure 20:
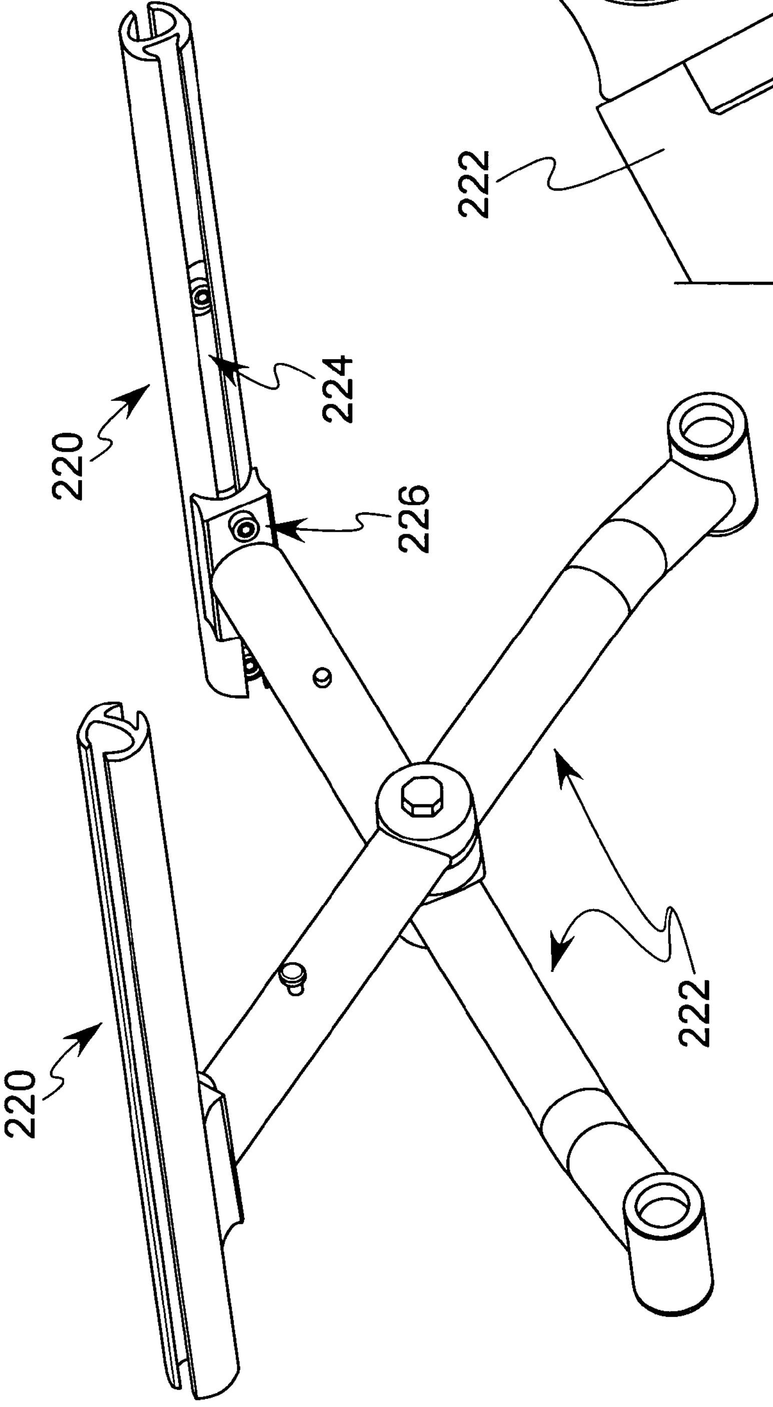
FIG. 20 is a perspective view of seat frame members secured to cross braces using dovetail slots and dovetail nuts.

It should be understood that the present invention is not intended to be limited to the wheelchairs and component parts described above. For example, as shown in FIGS. 20 and 21, seat frame members 220 that may be secured to cross braces 222 using dovetail slots 224 and dovetail nuts 226. This form of attachment allows the seat frame members 220 to be moved fore and aft with respect to the cross braces 222. It also allows the seat frame members 220 and seat upholstery (not shown) to be easily changed, without having to replace the cross braces 222, in order to accommodate growth in seat depth.

Figure 22:
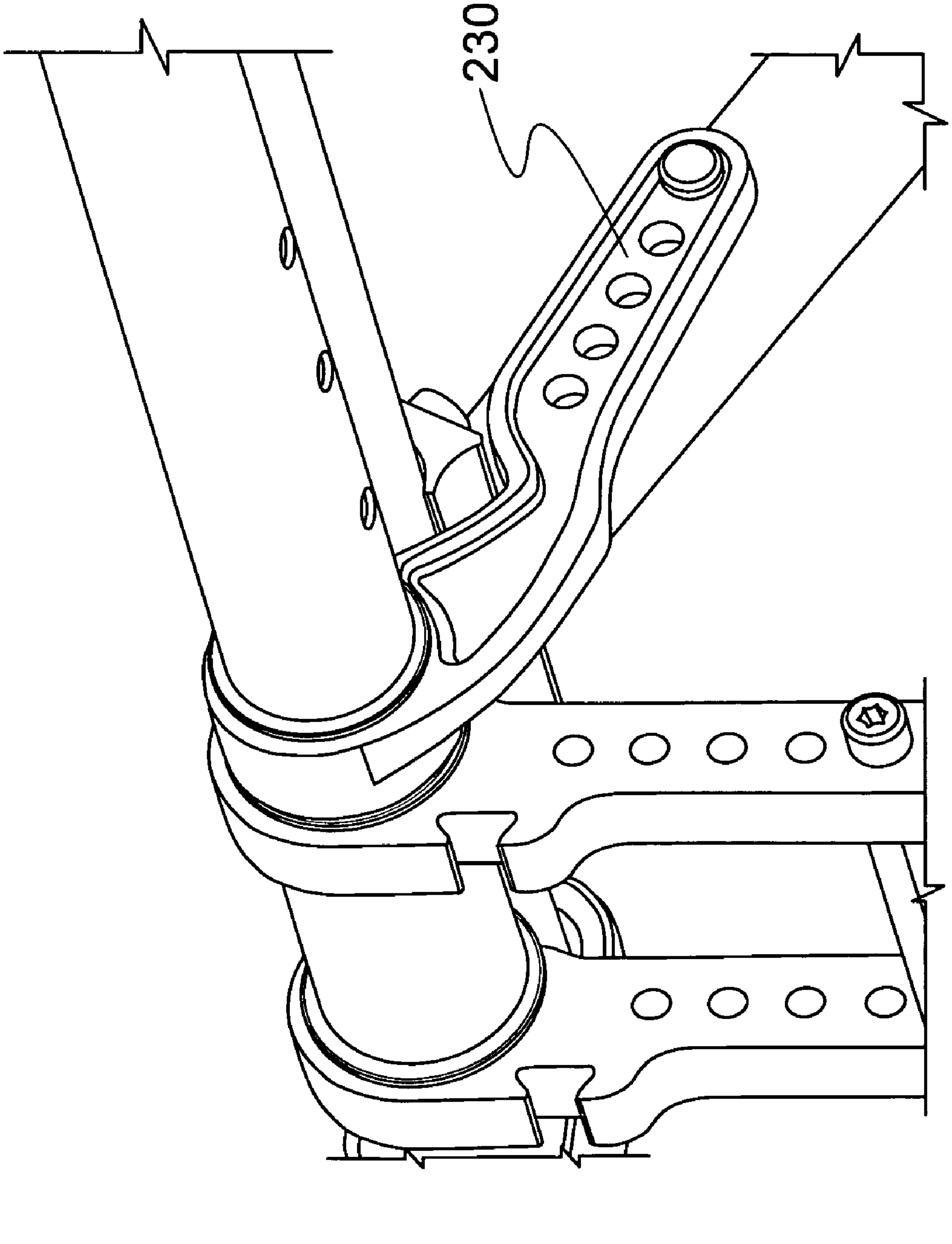
FIG. 22 is an enlarged partial perspective view of a wheelchair according to the present invention having cross brace links commonly practiced in the art.

As another example, cross brace links 230 may employ a methodology, as shown in FIG. 22, which is commonly practiced in the art.

Figure 24:
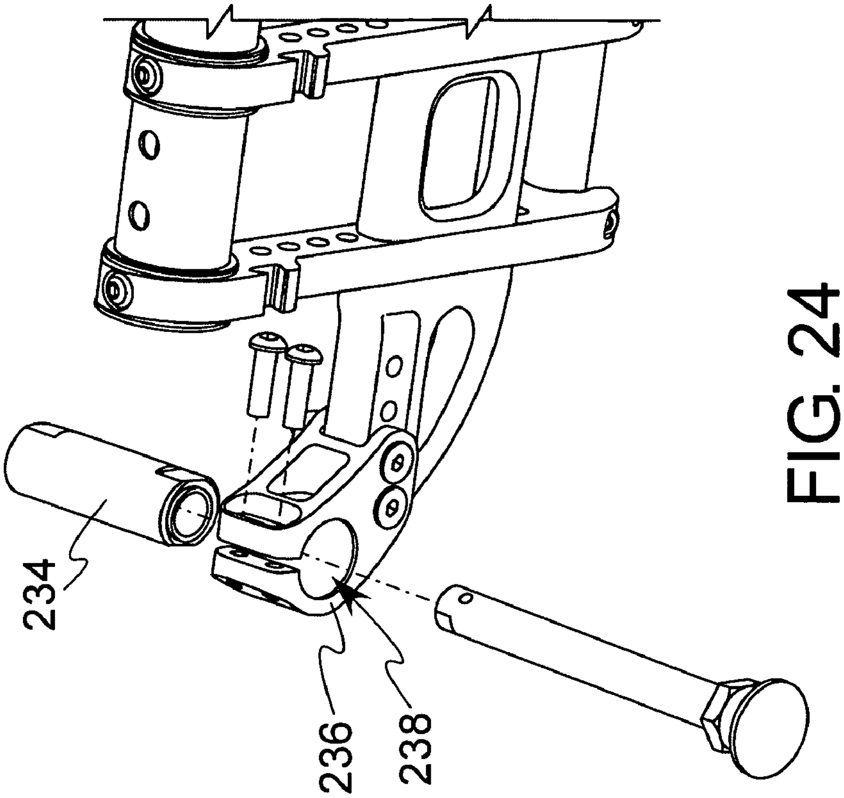
FIG. 24 is a partially exploded perspective view of the wheel mounting assembly shown in FIG. 23.
Figure 23:
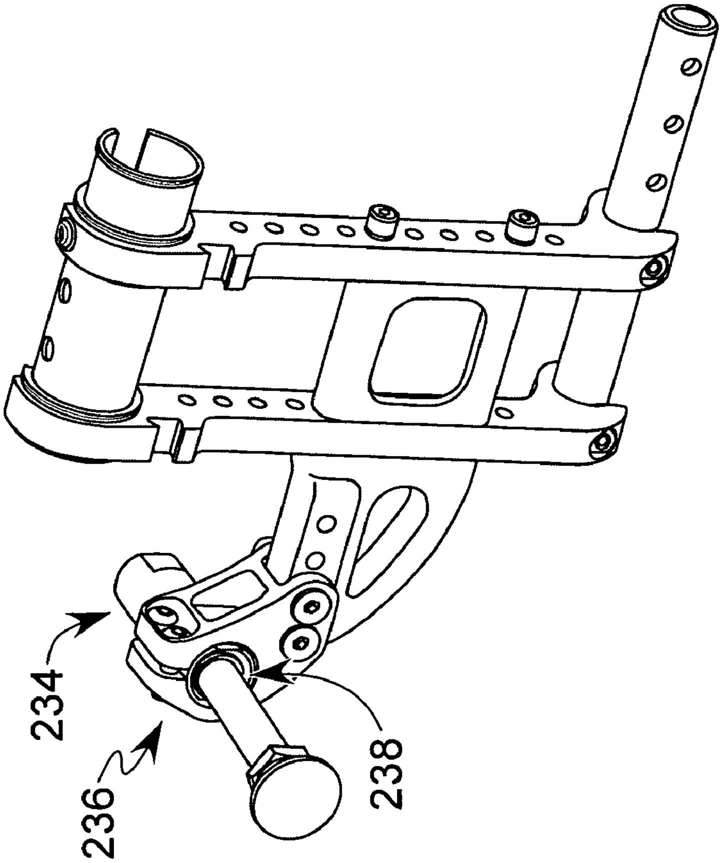
FIG. 23 is a perspective view of a wheel mounting assembly according to an alternative embodiment of the invention.

Wheel mounting assemblies 232 may include an axle sleeve 234 that is held with respect to an axle sleeve mount 236 by clamping configuration 238, as shown in FIGS. 23 and 24, instead of having a threaded axle sleeve 136 and nut 137 to adjust inboard and outboard wheel spacing and toe in and toe out, as described above. This configuration 238 may provide the same adjustments, such as wheel spacing and toe in and toe out, as described above.

Figure 26:
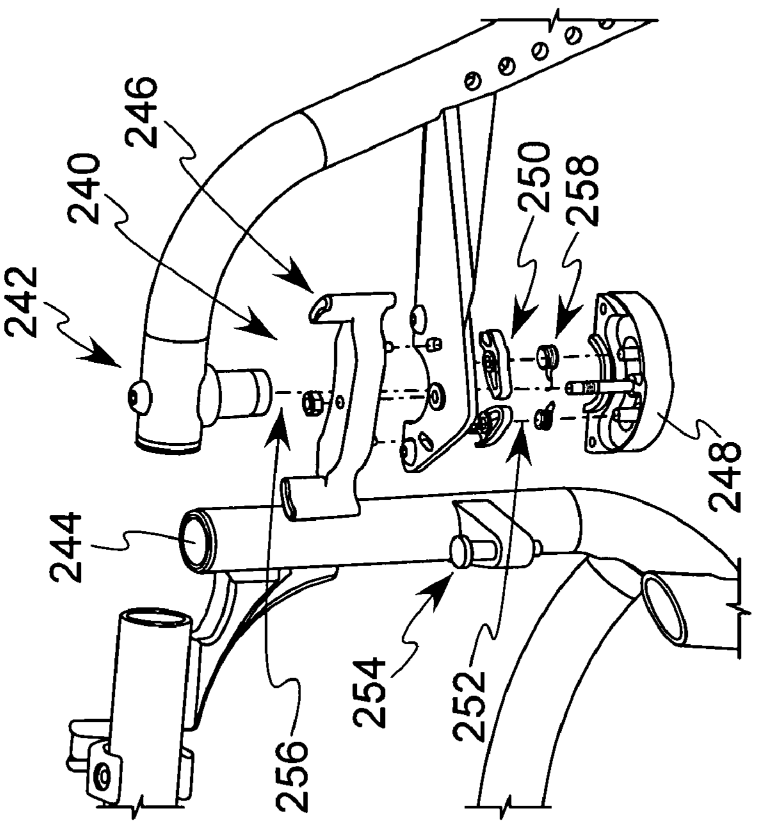
FIG. 26 is an exploded perspective view of the swing away footrest latch shown in FIG. 25.
Figure 25:
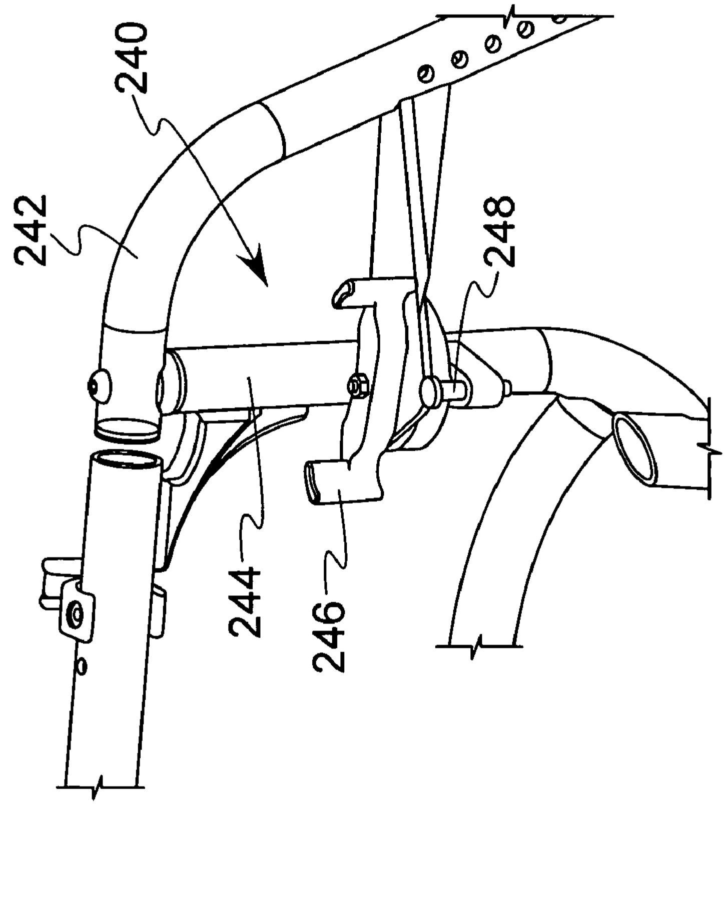
FIG. 25 is a perspective view of a swing away footrest latch according to a preferred embodiment of the invention.

As shown in FIGS. 25 and 26, a swing away footrest latch 240 may allow a footrest hanger 242 to swing both inboard and outboard, and lift off of a front side frame member 244 for removal. The swing away footrest latch 240 may include an activation lever 246, which, when pushed, may rotate about a lever pivot 248. Pins 250 on the activation lever 246 may engage with pawls 250 such that, as the activation lever 246 is pushed, the pawls 250 rotate about a pawl pivot 252. As the pawls 250 pivot, the pawls clear a path around a latch stud 254, allowing the footrest hanger 242 to rotate about a hanger pivot 256. Torsion springs 258 may keep the pawls 250 engaged against the latch stud 254, preventing the footrest hanger 242 from rotating when the activation lever 246 is not pushed, or when the footrest hanger 242 is latched.

Figure 28:
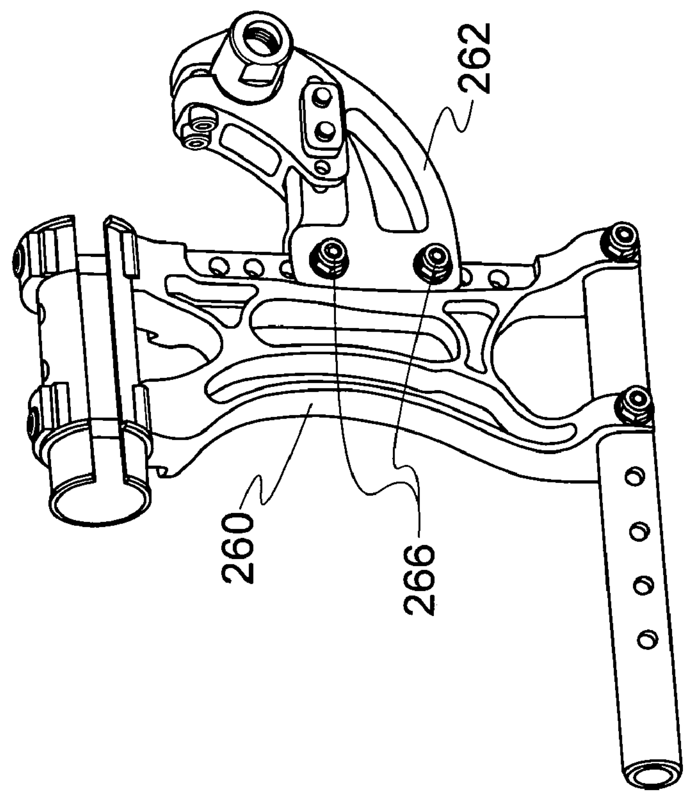
FIG. 28 is a perspective view of the wheel mounting assembly shown in FIG. 27 taken from the inside of the wheelchair.
Figure 27:
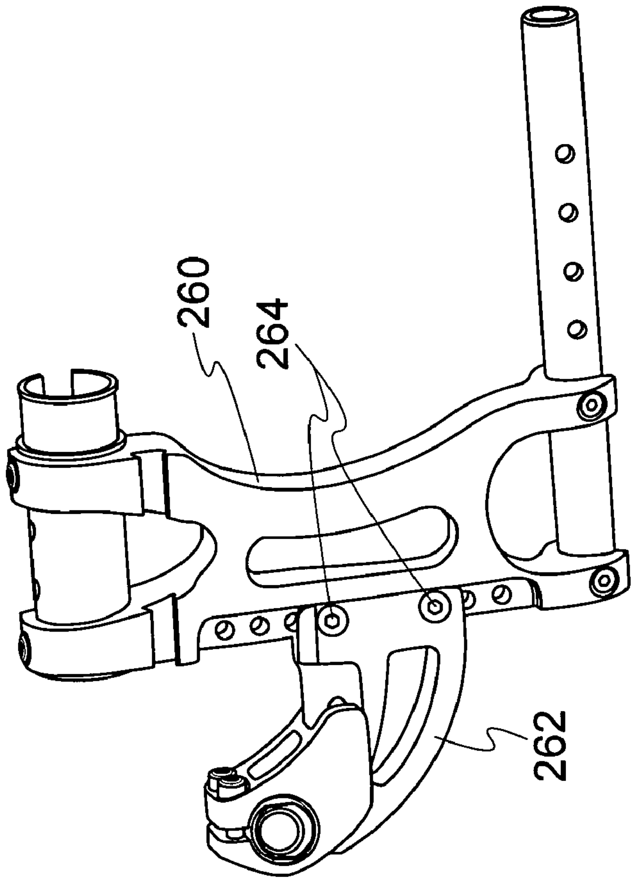
FIG. 27 is a perspective view of a wheel mounting assembly according to another embodiment of the invention taken from the outside of the wheelchair.

An alternative axle plate 260 is shown in FIGS. 27 and 28. This axle plate 260 is a one-piece axle plate, unlike the axle plate 129, described above, which has two legs 129*b*, 129*c* with a spacer 134 therebetween. Also, an alternative axle plate extension 262 is shown attached with two bolts 264 and nuts 266 passing in through the sides of the axle plate 260, as opposed in through the front or rear of the legs 129*b*, 129*c*, as described above.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A foldable wheelchair comprising:

a pair of opposed, substantially horizontally extending upper side frame members;

a pair of seat frame members;

a pair of axle plates, each of the axle plates having upper and lower ends, the upper end of each plate secured to a corresponding one of the upper side frame members;

a pair of axle housings, each of the axle housings secured to a corresponding one of the axle plates; and a pair of cross braces, each cross brace having a lower end pivotally secured directly to a corresponding one of the axle plates at the lower end of the axle plate, wherein each of the pair of cross braces is further secured at a cross brace upper end to a corresponding one of the seat frame members.

2. The foldable wheelchair of claim 1 further comprising a cross brace hinge securing the cross brace to the axle plate, the cross brace hinge including a first hinge leaf, the hinge secured to the axle plate at the first hinge leaf.

3. A foldable wheelchair comprising:

at least one substantially horizontally extending upper side frame member;

at least one axle plate having upper and lower ends, the upper end secured to the upper side frame member;

an axle housing secured to the axle plate; and a cross brace hinge secured directly to the axle plate, wherein the axle housing and the cross brace hinge are substantially equidistant from the upper side frame member; and a cross brace having a lower end secured to the axle plate via the cross brace hinge, the cross brace hinge operable to pivot the cross brace with respect to the axle plate.

4. The foldable wheelchair of claim 3 wherein the cross brace has an upper end that is secured to a seat frame member.

5. The foldable wheelchair of claim 3 wherein the axle plate is longitudinally adjustable relative to the upper side frame member so that the cross brace hinge is longitudinally adjustable.

6. The foldable wheelchair of claim 5 wherein the cross brace has an upper end that is secured to a seat frame member so that the cross brace is longitudinally adjustable relative to the seat support member.

7. The foldable wheelchair of claim 6 wherein the upper end of the cross brace is secured to the seat frame member so that the seat frame member is detachable from the cross brace to allow the seat support member to be replaced by another seat support member of differing length in order to change the depth of the wheelchair seat.

8. The foldable wheelchair of claim 3 wherein the axle housing is adjustable relative to the axle plate.

9. The foldable wheelchair of claim 3 wherein the axle plate and the axle housing matingly engage in a sliding tongue and groove engagement.

10. The foldable wheelchair of claim 3 wherein the cross brace is configured to pivot in a substantially vertical plane.

11. A foldable wheelchair comprising:

at least one upper side frame member, the upper side frame member having an engagement feature secured thereto;

at least one seat frame member, the seat frame member being moveable relative to the engagement feature as the wheelchair is articulated from a folded position to an unfolded position;

at least one axle plate having upper and lower ends, the upper end secured to the upper side frame member;

a wheel axle secured to the axle plate; and at least one cross brace secured to the axle plate, the cross brace being operable to pivot with respect to the axle plate.

12. The foldable wheelchair of claim 11, wherein a cross brace link is secured between the cross brace and the axle plate, and pivots with respect to the cross brace at a first end, and pivots with respect to the axle plate at a second end.

13. The foldable wheelchair of claim 12 wherein the cross brace link is positioned substantially below the upper side frame member such that the axle plate is substantially parallel to an opposite side frame member throughout a folding motion of the wheelchair.

14. The foldable wheelchair of claim 13 wherein the cross brace link is positioned at least two inches below the upper side frame member.

15. The foldable wheelchair of claim 11 wherein the seat frame member is secured to an upper end of the cross brace.

16. The foldable wheelchair of claim 15 further comprising one or more cradles mounted to the upper side frame member that supports the seat frame member when the wheelchair is in an unfolded condition, the cradle having one or more notches that engage with one or more protrusions on the seat frame member when the wheelchair is in the unfolded condition.

17. The foldable wheelchair of claim 15 wherein one or more protrusions are attached to the upper side frame member and one or more notches are formed in the seat frame member for engaging the protrusions.

18. The foldable wheelchair of claim 15 wherein one or more protrusions are attached to the seat frame member and one or more notches are formed in the upper side frame member for engaging the protrusions.

19. The foldable wheelchair of claim 11 the engagement feature is a pair of engagement features, the pair of engagement features being positioned between the seat frame member and the upper side frame member such that movement of the seat frame member with respect to the upper side frame member is prevented when the wheelchair is in an unfolded condition.

20. The foldable wheelchair of claim 19 wherein the engagement feature comprises one or more protrusions that engage with one or more notches.

* * * * *